(12) United States Patent
Matsuoka et al.

(10) Patent No.: US 6,348,958 B1
(45) Date of Patent: Feb. 19, 2002

(54) COLOR FILTER AND OPTICAL DISPLAY DEVICE

(75) Inventors: Koji Matsuoka, Matsusaka; Kenji Takii, Taki-gun; Shingo Kawashima, Matsusaka; Takamichi Honma; Takafumi Shimatani, both of Taki-gun; Masaharu Akitomo, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/497,674

(22) Filed: Feb. 4, 2000

(30) Foreign Application Priority Data

Feb. 26, 1999 (JP) .............................................. 11-049916

(51) Int. Cl.$^7$ ..................... G02F 1/1335; G02F 1/1333
(52) U.S. Cl. ..................... 349/106; 349/108; 349/109; 349/110; 430/7
(58) Field of Search ................................ 349/106, 110, 349/108, 109; 430/7

(56) References Cited

U.S. PATENT DOCUMENTS 4,097,919 A * 6/1978 Bobrick et al. ............. 362/270
5,757,452 A * 5/1998 Massaki et al. ............. 349/110
5,899,550 A * 5/1999 Masaki ....................... 349/106

OTHER PUBLICATIONS

Japanese Kokai (Published unexamined patent application) No. 62768/1998 (Tokukaihei 10–62768, Published Date: Mar. 6, 1998).

Japanese Kokai (Published unexamined patent application) No. 21992/1996 (Tokukaihei 8–21992, Published Date: Jan. 23, 1996).

\* cited by examiner

*Primary Examiner*—William L. Sikes
*Assistant Examiner*—Julie Ngo
(74) *Attorney, Agent, or Firm*—Nixon & Vanderhye, P.C.

(57) ABSTRACT

A color filter frame, which covers a non-display surface of an optical display section, is provided with frame color filter picture elements using at least two of three colors used for color filter picture elements, which correspond to displaying pixels. An area ratio of the frame color filter picture elements corresponding to different colors is set so as to be different from that of the color filter picture elements, which correspond to the colors used in the frame color filter picture elements. With this arrangement, it is possible to omit the step of manufacturing a black mask so as to reduce the cost; consequently, a color filter for an optical display device can be provided with an excellent appearance on a display.

18 Claims, 20 Drawing Sheets

COLOR FILTER AND OPTICAL DISPLAY DEVICE

FIELD OF THE INVENTION

The present invention relates to a color filter which can improve display quality and further concerns an optical display device using the same.

BACKGROUND OF THE INVENTION

Conventionally, as disclosed in Japanese Laid-Open Patent Publication No. 21992/1996 (Tokukaihei 8-21992, published on Jan. 23, 1996), a color filter used for a color liquid crystal display device has been provided with, for example, a stripe pattern or a dot pattern of red (hereinafter, referred to as R), green (hereinafter, referred to as G), and blue (hereinafter, referred to as B), that serves as coloring layers of color filter picture elements, on a transparent support.

Between the color filter picture elements and on a frame (outer frame), a black mask (also referred to as a black matrix) is disposed to improve contrast and display quality.

The black mask is disposed to provide a black color similar to a black display and is formed by patterning a black paste layer or a metal layer. Further, in some cases, a resin such as an acrylic resin having superior transparency is applied as an overcoat layer on a pattern including stripes of R, G, and B.

As for such a color filter, it has been considered to omit a step of manufacturing a black mask to reduce the cost. Conventionally, the following method has been well known for omitting the step of manufacturing a black mask: as shown in FIG. 20, among the coloring layers of R, G, and B corresponding to the R, G, and B color filter picture elements, that are used in a picture element part 31 acting as a display section, the coloring layers of R and B, or the coloring layers of R, G, and B are overlaid to one another, and the overlaid parts are displayed in black, so that a frame 30 is formed.

However, in the above conventional method, colors are overlaid to one another so as to be displayed in black; thus, the more colors are overlaid, the larger a thickness is. Hence, as shown in FIG. 20, height differences indicated by arrows 32 appear between the picture element part 31 and the frame 30 on a driving side, so that a cell thickness becomes uneven. Therefore, in a portion of the picture element part 31 that is adjacent to the frame 30, an amount of light is smaller than that of the center, resulting in degradation in display quality of the picture element part 31.

Hence, in order to overcome the uneven cell thickness caused by the height difference, it has been considered to form the frame by extending a stripe having the same pitch width as the picture element; however, a belt having the same width as the picture element is visually observed, so that display quality is degraded (stripes are readily found by visual observation because the stripe has a large width and the same pitch as the picture elements corresponding to pixels).

In order to overcome the above problem, Japanese Laid-Open Patent Publication No. 62768/1998 (Tokukaihei 10-62768, published on Mar. 6, 1998) discloses that each of the picture elements corresponding to the colors has a pitch and a width of 100 μm or less in the frame, so that display quality can be improved.

However, in the conventional color filter, each of the picture elements, which correspond to the different colors, has the same width in the frame. Thus, the area ratio of the picture elements is 1:1:1, and the colors are evenly displayed in the frame. Therefore, in the conventional art, the colors go out of balance between the frame and the display section, or between the frame and a cabinet of the color liquid crystal display device, resulting in degradation in appearance during the operation of the color liquid crystal display device.

SUMMARY OF THE INVENTION

The objective of the present invention is to omit a step of manufacturing a black matrix so as to reduce the cost, and to provide a color filter for an optical display device that realizes an excellent appearance upon providing a display.

In order to achieve the above objective, a color filter of the present invention includes a color filter display which consists of picture elements corresponding to three colors and displays an image, and a color filter frame which serves as a frame of the color filter display and consists of picture elements corresponding to at least two of the three colors, the color filter frame having an area ratio of the picture elements that is different from that of the color filter display, the picture elements corresponding to different colors.

Further, in order to achieve the above objective, another color filter of the present invention includes a color filter display which consists of picture elements corresponding to three colors and displays an image, and a color filter frame which serves as a frame of the color filter display and consists of picture elements corresponding to at least two of the three colors, the color filter frame having an area ratio of the picture elements that is set so as to allow the color filter frame to have a desired color, the picture elements corresponding to different colors.

According to this arrangement, the color filter display consists of the picture elements corresponding to three colors, and the color filter frame serving as a frame of the color filter display consists of picture elements corresponding to at least two of the three colors of the color filter display.

In a conventional color filter, for example, the color filter frame consists of picture elements corresponding to three colors, and each of the picture elements has a line width of 100 μm or less. With this arrangement, the picture elements of the color filter frame cannot be individually recognized so as to be observed as a single color. Namely, such an arrangement of the picture elements acts as a black matrix in the color filter frame, so that it is not necessary to provide a metal layer and the like as a black matrix. Thus, it is possible to omit the step of manufacturing a black matrix in the color filter frame so as to reduce the cost.

However, the conventional arrangement has the following problem. A conventional color filter frame simply consists of picture elements corresponding to two colors, so that an area ratio of the picture elements corresponding to different colors is 1:1:1, which is equal to that of the color filter display. Therefore, only a single kind of color can be developed, so that a variety of colors cannot appear in the color filter frame. Hence, in a color liquid crystal display device using the conventional color filter, the appearance is spoiled during an operation and a displayed image becomes less easy to see.

Meanwhile, with the arrangement of the present invention, in the color filter frame, an area ratio of the picture elements corresponding to different colors is different from that of the color filter display. Or in the color filter frame, an area ratio of the picture elements corresponding to different colors is set so as to allow the color filter frame to have a desired optical property.

To be specific, in the color filter display, an area ratio of picture elements corresponding to different colors is 1:1:1; meanwhile, the area ratio is, for example, 1:1:2 in the color filter frame. The area ratio is set so as to allow the color filter frame to have a desired optical property such as a reflectivity and color.

With this arrangement, it is possible to develop a desired color in the color filter frame so as to improve a degree of freedom in arranging colors for the color filter frame. Hence, with the color filter having the above arrangement, it is possible to arrange a suitable color for the color filter frame, based on a color displayed in the operation of each optical display device. Thus, it is possible to prevent a spoiled appearance during the operation and to prevent a displayed image from being less easy to see.

Further, in order to achieve the aforementioned objective, an optical display device of the present invention includes a color filter having a color filter display which consists of picture elements corresponding to three colors and displays an image, and a color filter frame which serves as a frame of the color filter display and consists of picture elements corresponding to at least two of the three colors, the color filter frame having an area ratio of the picture elements that is different from that of the color filter display, the picture elements corresponding to different colors.

With this arrangement, in the color filter frame, an area ratio of the picture elements corresponding to different colors is different from that of the color filter display, and the area ratio is set so as to allow the color filter frame to have a desired color. Thus, it is possible to develop a desired color in the color filter frame so as to improve a degree of freedom in arranging colors for the color filter frame.

Therefore, in the optical display device provided with the color filter having the above arrangement, it is possible to arrange a suitable color for the color filter frame, based on a color displayed in the operation of each optical display device. Hence, it is possible to prevent the spoiled appearance during the operation and to prevent a displayed image from being less easy to see.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 19, the following explanation describes one embodiment of the present invention.

Figure 2:
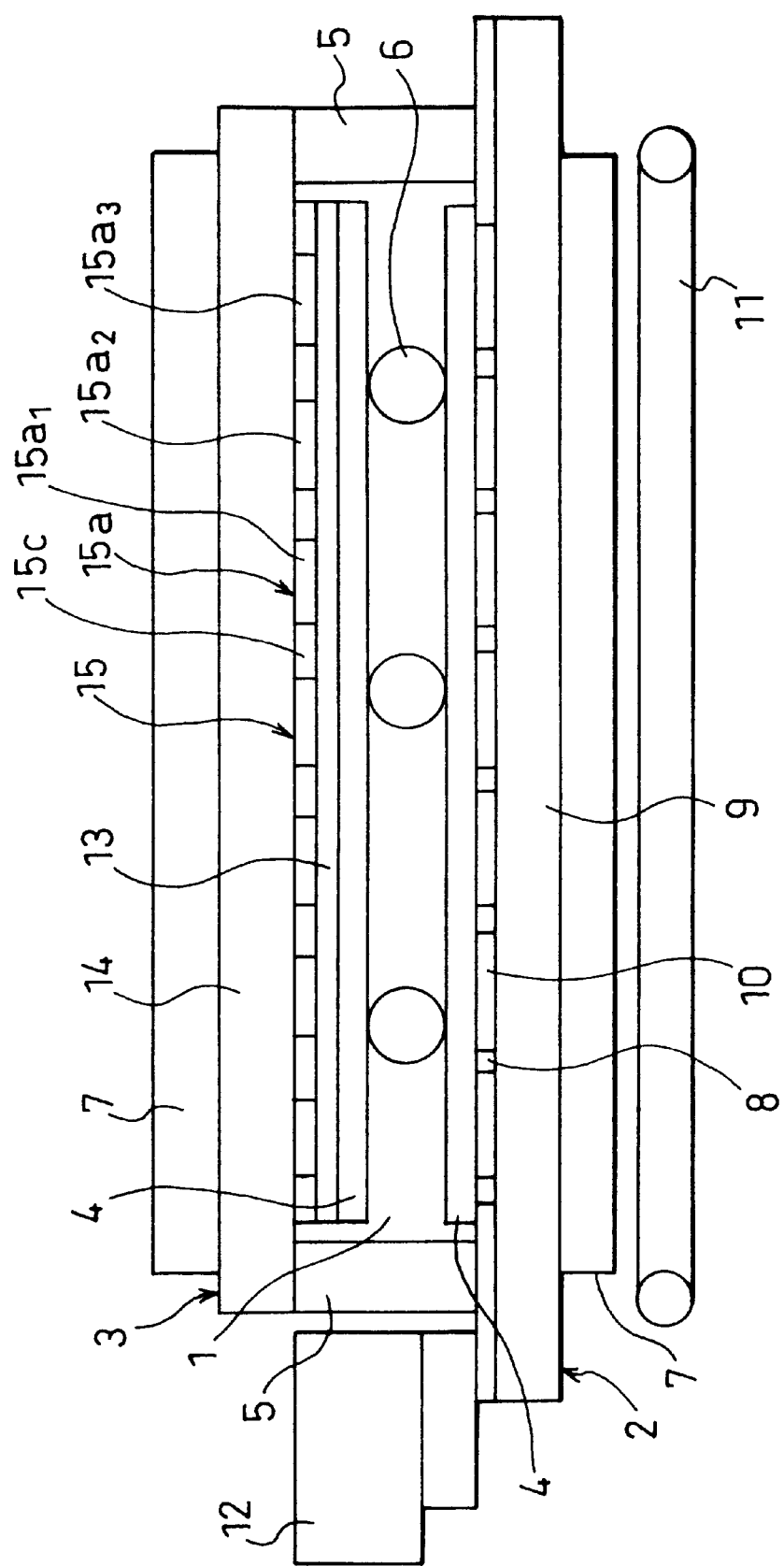
FIG. 2 is an explanatory drawing schematically showing an LCD which serves as an optical display device using the color filter.

As shown in FIG. 2, a color filter of the present invention is used in, for example, a liquid crystal display device (hereinafter, abbreviated as LCD) serving as an optical display device with an active matrix (hereinafter abbreviated as AM) of a transmission-type color display. Firstly, the following explanation discusses the LCD.

In the LCD, a liquid crystal layer 1 with a thickness of 3 to 10 $\mu$m is sandwiched (disposed between) an AM substrate 2 and a color filter substrate 3. The AM substrate 2 is provided with a transparent electrode and a liquid crystal alignment film, and the color filter substrate 3 opposes the AM substrate 2. Liquid crystal alignment films 4 are disposed respectively on a contact surface between the liquid crystal layer 1 and the AM substrate 2 and a contact surface between the liquid crystal layer 1 and the color filter substrate 3. Further, in the LCD, ends of the liquid crystal layer 1 are airtightly sealed with a seal material/sealing material 5 so as to complete a cell structure.

In the LCD, a gap of the cell structure, that is equivalent to a thickness of the liquid crystal layer 1, is controlled in accordance with a diameter of a spacer 6 added in the liquid crystal layer 1. Additionally, the spacers 6 are formed into balls in the present embodiment; however, instead of the spacers 6 of the present embodiment, it is possible to dispose column-shaped spacers on a transparent support on either the AM substrate 2 or the color filter substrate 3.

Moreover, outer surfaces of the AM substrate 2 and the color filter substrate 3 are respectively provided with polarizers 7, which interrupt or pass light polarized in the liquid crystal layer 1. Here, in the case of a reflection-type LCD, one of the polarizers 7 is integrated with a light reflective film.

Switching elements 8 such as an a-Si TFT (Thin-Film Transistor), a p-Si TFT, an MIM TFD (Thin-Film Diode) are placed and formed in a matrix form on a glass substrate 9 of the AM substrate 2. Further, the switching elements 8 are combined respectively with transparent pixel electrodes 10 in pairs. Therefore, the switching elements 8 and the transparent pixel electrodes 10 are sandwiched between the glass substrate 9 and the liquid crystal alignment film 4.

Additionally, in the case of a passive matrix (PM) LCD (not shown), only transparent electrodes are formed into stripes on a glass substrate of a PM substrate corresponding to the AM substrate 2.

Furthermore, in order to secure enough brightness in a color display, the LCD is provided with a back light 11 and a driving section 12 for driving the switching elements 8.

Meanwhile, on the color filter substrate 3, a transparent common electrode 13 serving as an integral electrode is provided between the liquid crystal alignment film 4 and a glass substrate 14 of the color filter substrate 3 so as to oppose the transparent pixel electrodes 10 of the AM substrate 2.

Further, on the color filter substrate 3, rectangle color filters 15 are disposed and formed in a matrix form so as to be sandwiched between the transparent common electrode 13 and the glass substrate 14. The color filters 15 have coloring layers (described later) of primary colors consisting of R, G, and B as the picture elements, which respectively correspond to the transparent pixel electrodes 10 (here, the picture elements constitute each of the pixels and correspond to primary colors of R, G, and B) . Moreover, on the color filter substrate 3, it is also possible to form black masks for shielding light between the color filters 15 and between coloring patterns of the color filter 15.

Along a display surface, a cross-sectional area of the color filters 15 and a cross-sectional area of the liquid crystal layer 1 are set larger than the display section formed by the transparent pixel electrodes 10. This arrangement makes it possible to prevent a display image provided on ends of the display section from being darker than the center of the display section, thereby causing no degradation in quality of a display image.

Figure 1:
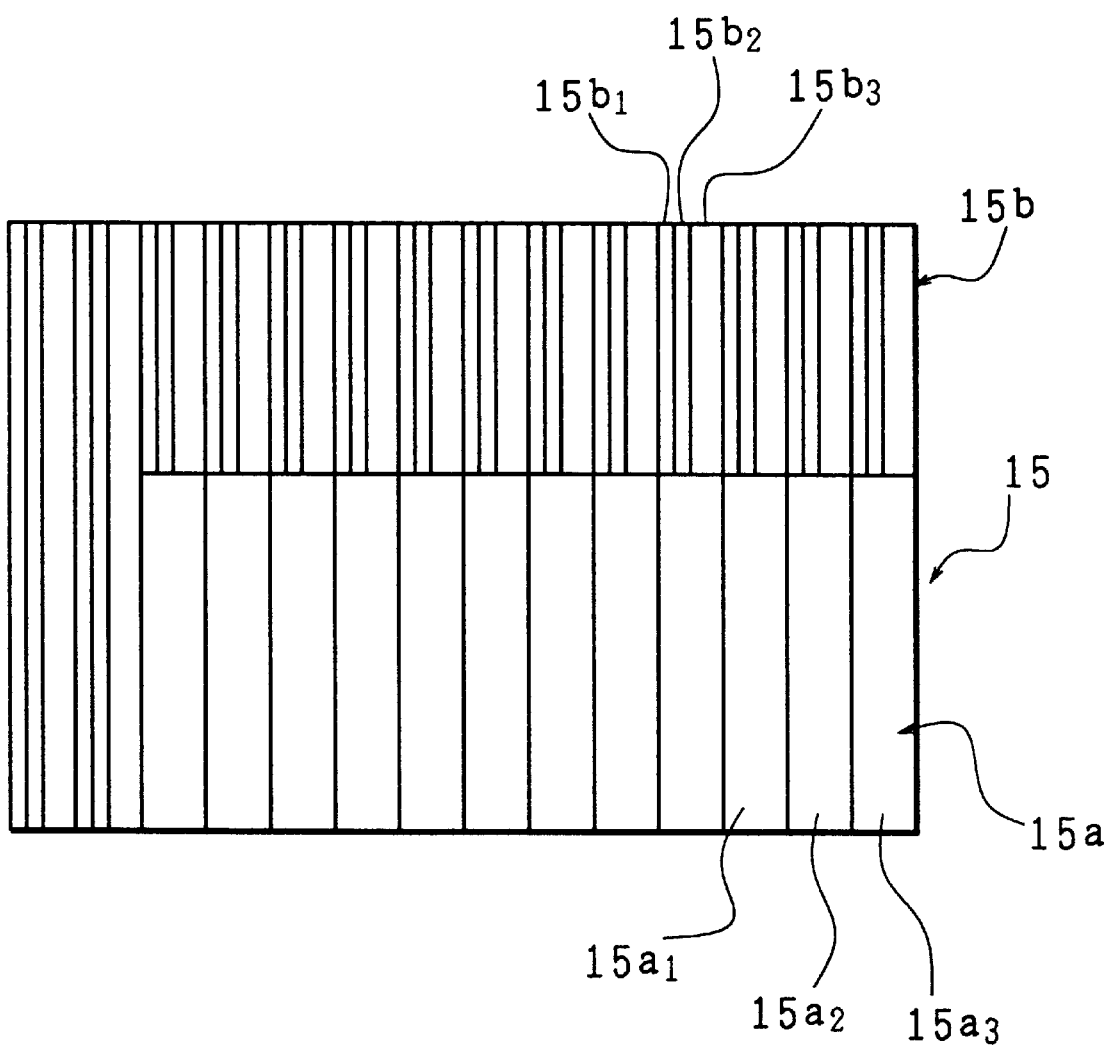
FIG. 1 is an explanatory drawing showing a main part of a color filter described in Embodiment 1 of the present invention.

Therefore, as shown in FIG. 1, the color filter 15 has a rectangular color filter display 15a and a color filter frame 15b which is formed so as to extend from the end of each color filter display 15a to the outside, in a state in which the surfaces of the color filter display 15a and the color filter frame 15b are flush with each other.

FIG. 1 shows only a corner of the color filter 15. Further, FIG. 1 shows, as an example, the arrangement where color filter picture elements 15a$_1$, 15a$_2$, and 15a$_3$, frame color filter picture elements 15b$_1$, 15b$_2$, and 15b$_3$ of the color filter 15 are formed into stripes.

Figure 3:
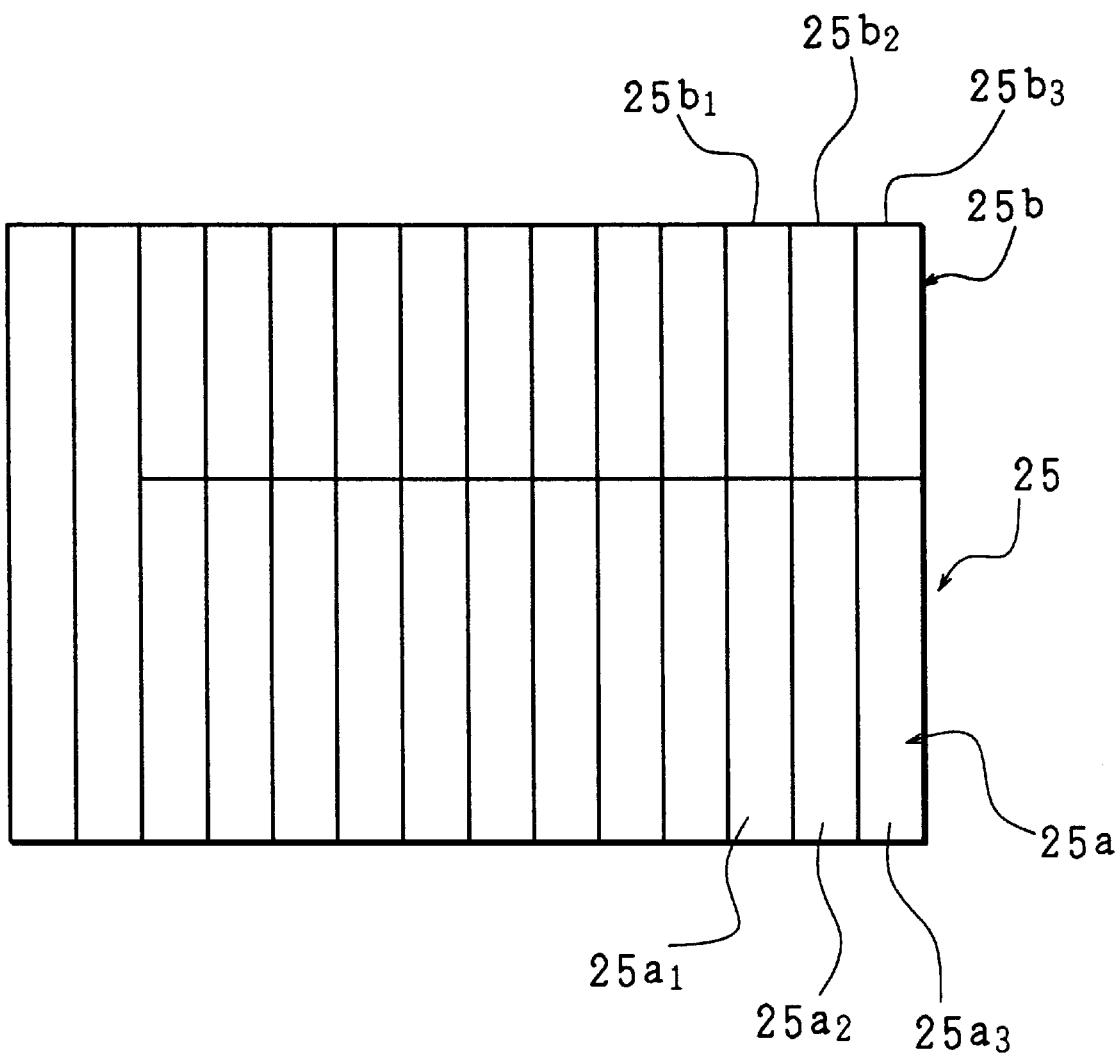
FIG. 3 is an explanatory drawing showing a main part of a conventional color filter for comparison.
Figure 4:
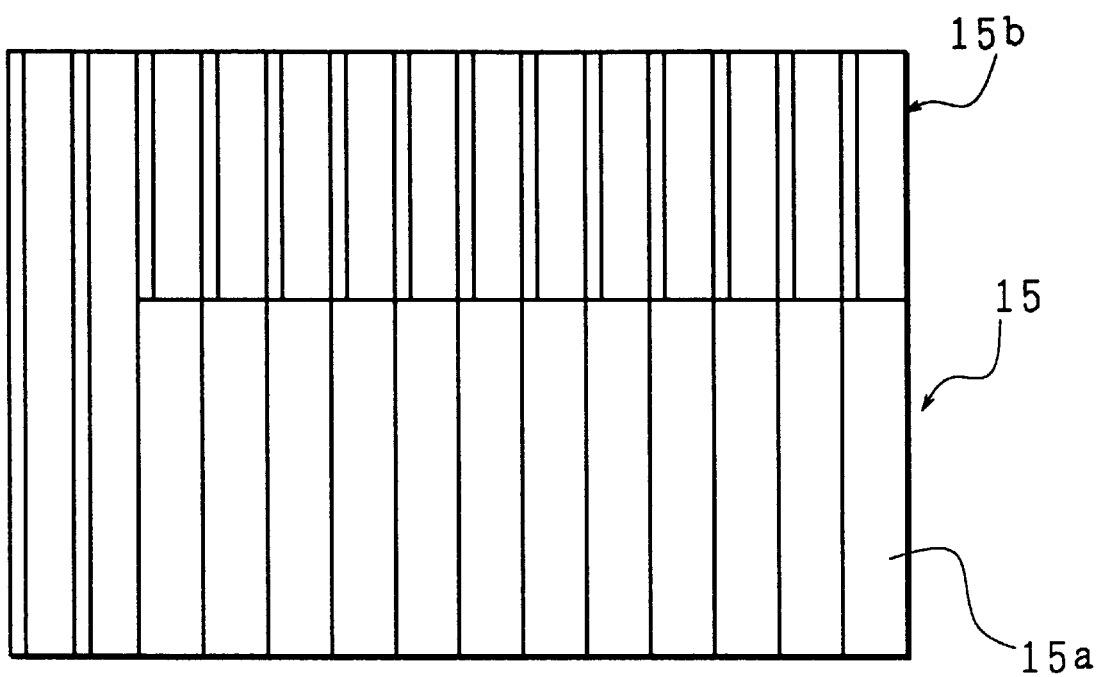
FIG. 4 is an explanatory drawing showing a main part of a color filter described in Embodiment 2 of the present invention.

Incidentally, like the conventional art, in a color filter 25 shown in FIG. 3, each of stripe-shaped frame picture elements 25b$_1$, 25b$_2$, and 25b$_3$ of a color filter frame 25b has a width of 150 μm, which is more than 101 μm and is equal to a width of each display elements 25a$_1$, 25a$_2$, and 25a$_3$ corresponding to displaying pixels of a color filter display 25a (line width ratio of the frame picture elements is 1:1:1). In this case, the stripes are visually observed in the color filter frame 25b.

Here, in Example 1, as shown in FIG. 1, the frame color filter picture elements 15b$_1$, 15b$_2$, and 15b$_3$ of the color filter frame 15b are formed into stripes of R, G, and B, each picture element having a line width of 100 μm or less, here, 25 μm, 25 μm, and 50 μm. Also, a pitch (repeat distance between pixels) and a width ratio of the frame color filter picture elements 15b$_1$, 15b$_2$, and 15b$_3$ are set so as to be different from those of the conventional art and the color filter picture elements 15a$_1$, 15a$_2$, and 15a$_3$ of the color filter display 15a. Here, the line width ratio of the frame color filter picture elements 15b$_1$, 15b$_2$, and 15b$_3$ is set at 1:2:2. In this case, the color filter frame 15b is visually observed in a single color of gray during the operation of the LCD, so that the stripe-shaped frame color filter picture elements 15b$_1$, 15b$_2$, and 15b$_3$ of the color filter frame 15b cannot be distinguished from one another. Moreover, in the color filter frame 15b, the stripes of the frame color filter picture elements 15b$_1$, 15b$_2$, and 15b$_3$ are not visually confirmed. Consequently, it is possible to improve display quality of the LCD.

Further, in Example 2, two (R and B) of the three colors, which are used in the color filter display 15a, have a line width and a pitch of 100 μm or less, here, 25 μm and 75 μm respectively for R and B. At this time, the color filter frame 15b is visually observed in a single color of violet during the operation of the LCD, and the stripe-shaped frame color filter picture elements of the color filter frame 15b cannot be distinguished from one another, so that the stripes cannot be confirmed. Therefore, the arrangement of Example 2 can also improve display quality of the LCD.

This is because in the case of an ordinary person with eyesight of 1.0 or corrected eyesight of 1.0, a resolution limit for visual observation is about 100 μm. Thus, when a pitch is 150 μm or more, the stripes are readily observed. When a pitch is between 150 μm and 100 μm, observation varies person to person depending upon resolution limits. When a pitch is set at 100 μm or less as described in the present invention so as to be completely below the human resolution limit, so that the stripes are visually observed in a single color.

Figure 5:
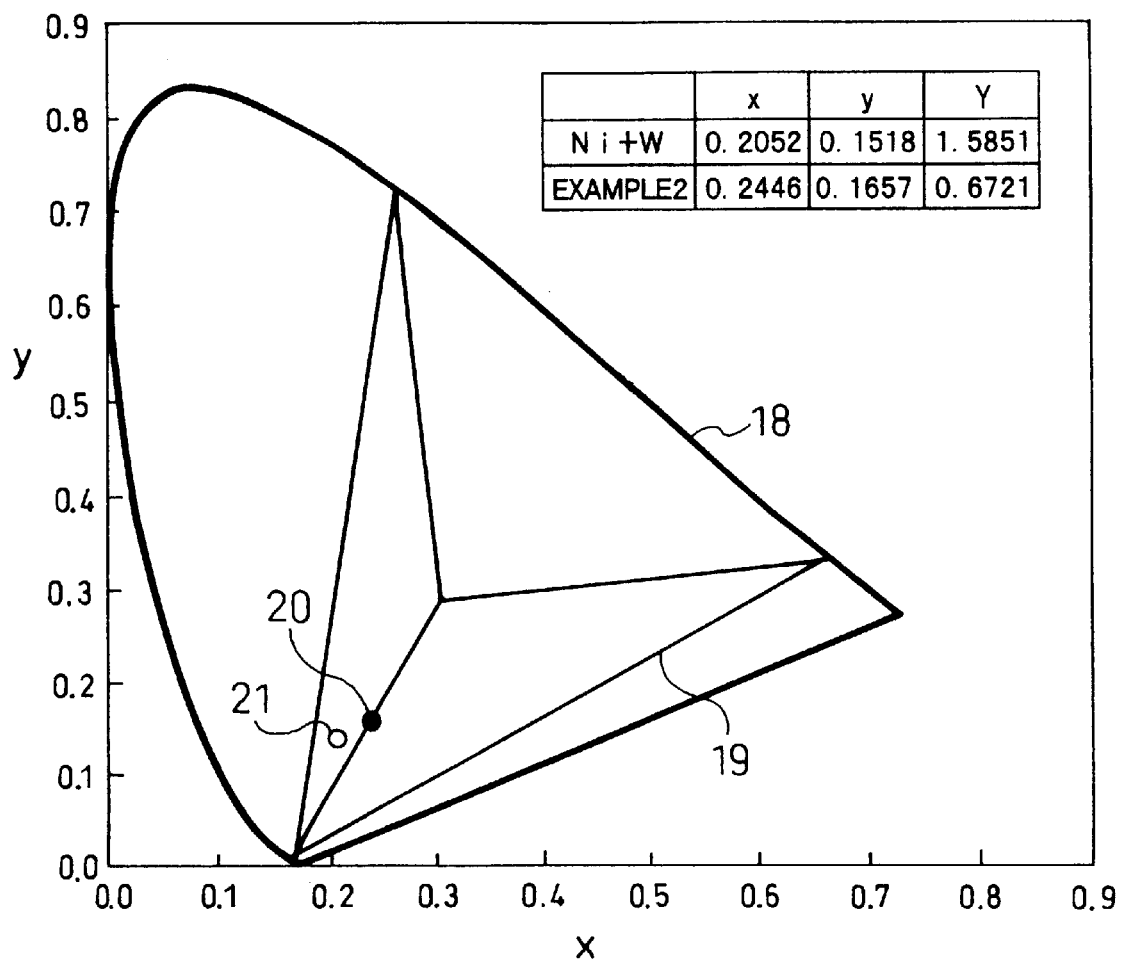
FIG. 5 is a graph showing a CIE chromaticity and reflectivity of the color filter and a conventional metal layer for comparison, and a range of chromaticity of primary colors.

When the color filter frame 15b is formed by using at least two of R, G, and B, it is possible to obtain an desired optical property (coloring) by setting an area ratio of the colors. As shown in FIG. 5, in a visible area 18, all colors in a triangle 19, which includes primary colors, can be reproduced and allocated.

As for the color filter frame 15b described in Example 2, a reflectivity property is measured. FIG. 5 shows a result of comparing data on reflectivity between the color filter frame 15b of Example 2 and the conventional outer frame formed by a metal black mask. As the black mask, a metal layer made of commercial nickel—tungsten (Ni+W) is used.

The reflectivity is measured as follows: when a light source is a C light source and aluminum is a reference, relative to a visible area, CIE chromaticity and reflectivity are measured regarding the color filter frame 15b of Example 2 and the outer frame formed by the metal layer. CIE is an abbreviation of Commission Internationale de l'Eclairage (International Commission on Illumination). Further, in the measurement result, Y represents luminance, and (x,y) represents chromaticity coordinates.

As shown in these results, relative to the chromaticity of (x, y, Y; 0.2052, 0.1518, 1.5851, indicated by 21 in FIG. 5) of the outer frame formed by a metal black mask, the color filter frame 15b of Example 2 exhibits chromaticity of (x, y, Y; 0.2446, 0.1657, 0.6721, indicated by 20 in FIG. 5); therefore, it is possible to obtain a reflectivity property equivalent to that of a metal black mask, so that the coloring becomes less visible.

Hence, in the arrangement of Example 2, the color filter frame 15b can be manufactured simultaneously with the picture elements of the color filter display 15a, so that the manufacturing process can be simplified. Further, it is possible to substitute for the metal black mask, so that the manufacturing process thereof can be omitted so as to lower the cost.

Moreover, the LCD has a disadvantage of generating a moire in the color filter frame 15b during the operation, at the time that a wiring pattern of a metal layer, which is disposed in a source extending part of the AM substrate 2 provided on a driving side, is arranged in parallel with a pattern of the frame color filter picture elements 15b, disposed in the color filter frame 15b; a distance between the parallel patterns is long; and the pattern of the frame color filter picture elements $15b_1$, $15b_2$, and $15b_3$ in the color filter frame 15b is arranged with the same pitch as the displaying pixels, relative to the wiring pattern of the metal layer including a source (may be drain) signal line and the gate extending part on the AM substrate 2, which is provided on the driving side.

However, in the present invention, in accordance with a pitch of the wiring pattern of a metal layer including the source (may be drain) signal line and the gate extending part, a scaling factor of a pitch of the frame color filter picture elements $15b_1$, $15b_2$, and $15b_3$ is varied as necessary. This arrangement makes it possible to positively prevent the occurrence of moire.

As described above, in the present invention, when the frame of the color filter is formed by using colors constituting the pixel, 1̂ the frame is formed with a line width and a pitch, that are different from those of the displaying pixel, and 2̂ the line width is set at 100 µm or less so as to process with high definition below human visual resolution; thus, the stripes on the frame are visually made even (single color) so as to improve quality.

Namely, as for the color filter and the an optical display device including the same of the present invention, in the color filter frame, at least one of the picture elements that corresponds to one color has a different width from the other picture elements belonging to the other colors.

Namely, in the color filter and the optical display device including the same of the present invention, as for the picture elements corresponding to different colors in the color filter frame, an area ratio is set so as to allow the color filter frame to have a desired optical property including reflectivity and colors.

The color filter of the present invention can be manufactured by a variety of methods including dry film lamination method (hereinafter, also referred to as DFL method), dyeing method, pigment dispersing method, printing method, electrodeposition method, and ink jet method. The following explanation discusses the manufacturing method thereof.

In the case of the DFL method, in the conventional art, after a glass substrate is washed, the following process is repeated for each color or for each color if necessary: bonding a film for a first color→exfoliation of a protection film→exposure→development→post exposure→baking. And then, a baking operation completes the color filter.

Meanwhile, in the case of the present invention, it is possible to reduce the conventional steps. Upon exposure of: bonding a film for a first color→exfoliation of a protection film→exposure, a part corresponding to the color filter frame 15b can be exposed by using at least two of the colors used in the color filter display 15a with a pattern having a varied area ratio of the colors, so that the color filter frame 15b is completed.

In the case of the dyeing method, in the conventional art, the following process is repeated for each color: manufacturing a pointing metal black mask (manufacturing flow: deposition→photoresist process→etching) →washing→applying a positive resist→baking→exposure →development→dyeing→fixing→baking.

And then, a protection film is applied and a baking operation completes a color filter.

However, in the case of the present invention, it is possible to omit the step of manufacturing the pointing metal black mask. Upon exposure of: washing→applying a positive resist→baking→exposure, a part corresponding to the color filter frame 15b can be exposed by using at least two of the colors used in the color filter display 15a with a pattern having a varied area ratio of the colors, so that the color filter frame 15b is completed.

In the case of the pigment dispersing method, in the conventional art, the following process is repeated for each color: manufacturing a pointing metal black mask (manufacturing flow: deposition→photoresist process→etching)→washing→applying a negative resist→baking→applying an oxygen barrier film→baking→exposure→development→baking. And then, the color filter is completed after: post exposure→post baking→grinding residue.

However, in the case of the present invention, it is possible to omit the step of manufacturing the pointing metal black mask. Upon exposure of: washing→applying a negative resist→baking→applying an oxygen barrier film→baking→exposure, a part corresponding to the color filter frame 15b can be exposed by using at least two of the colors used in the color filter display 15a with a pattern having a varied area ratio of the colors, so that the color filter frame 15b is completed.

In the case of the printing method, as described above, in the conventional art, after the metal black mask or other pointing black masks are manufactured, the process of: washing and pattern printing→baking is repeated for each color, and the process of: applying a protection film→baking completes the color filter. Meanwhile, in the present invention, it is possible to omit the step of manufacturing the black mask, a part corresponding to the color filter frame 15b can be exposed in the print of the pattern printing by using at least two of the colors used in the color filter display 15a with a pattern having a varied area ratio of the colors, so that the color filter frame 15b is completed.

In the case of the electrodeposition method, in the conventional art, the process of: washing a glass substrate→applying a resist after deposition of ITO→exposure after baking→development→electrodeposition→washing with water is repeated for each color and for each black color. And then, the process of: exfoliation→post baking→applying a protection film→baking completes the color filter.

Meanwhile, in the present invention, it is possible to omit the process of: exposure of black→development→electrodeposition→washing with water. Upon exposure of each color, a part corresponding to the color filter frame 15b can be exposed by using at least two of the colors used in the color filter display 15a with a pattern having a varied area ratio of the colors, so that the color filter frame 15b is completed.

In the case of the ink jet method, in the conventional art, after manufacturing and washing the pointing metal black mask or other pointing black masks, the color filter is manufactured by the process of: coating and fixing a color-applying layer (whether this step is adopted depending upon a kind of ink)→colors are applied (coloring)→baking.

Meanwhile, in the present invention, it is possible to omit the step of manufacturing the black mask, and upon coloring the colors of ink, a part corresponding to the color filter frame 15b can be colored by using at least two of the colors used in the color filter display 15a with a pattern having a varied area ratio of the colors, so that the color filter frame 15b is completed.

As described above, the method for manufacturing the color filter of the present invention can be applied to all kinds of methods including the DFL method, the dying method, the pigment dispersing method, the printing method, the electrodeposition method, and the ink jet method. In addition, it is possible to omit the step of manufacturing the black mask. Here, as shown in FIG. 1, a gap 15c, which is provided between the color filter picture elements $15a_1$, $15a_2$, and $15a_3$ in the color filter display 15a, is formed by a line such as a source bus line, a gate bus line, and a pixel capacity line of the AM substrate 2; or the coloring layers (R,G,B), which serve as the color filter picture elements $15a_1$, $15a_2$, and $15a_3$ of the color filter display 15a, are overlaid to one another so as to substitute for the black mask.

Therefore, it is possible to omit the step of manufacturing the black mask upon manufacturing the color filter display 15a. The source bus line, the gate bus line, and the pixel capacity line are arranged so as to intersect with one another around each of the transparent pixel electrodes 10 disposed in a matrix form.

The present invention can be applied to all kinds of color filters for a display including an EL color display, a DUTY liquid crystal color display, and a PDP display as well as a TFT liquid crystal color display.

Further, in the above arrangement, a metal layer for shielding light, for example, a light-shielding pattern may be completely mounted on a part of the AM substrate 2 that corresponds to the color filter frame 15b, the light-shielding pattern being made of a material such as tantalum, aluminum, and titanium that is used for a gate and a source, so that it is possible to further prevent leak of light. Consequently, the display quality can be further improved.

The following explanation discusses variations of the color filter frame 15b.

Figure 6:
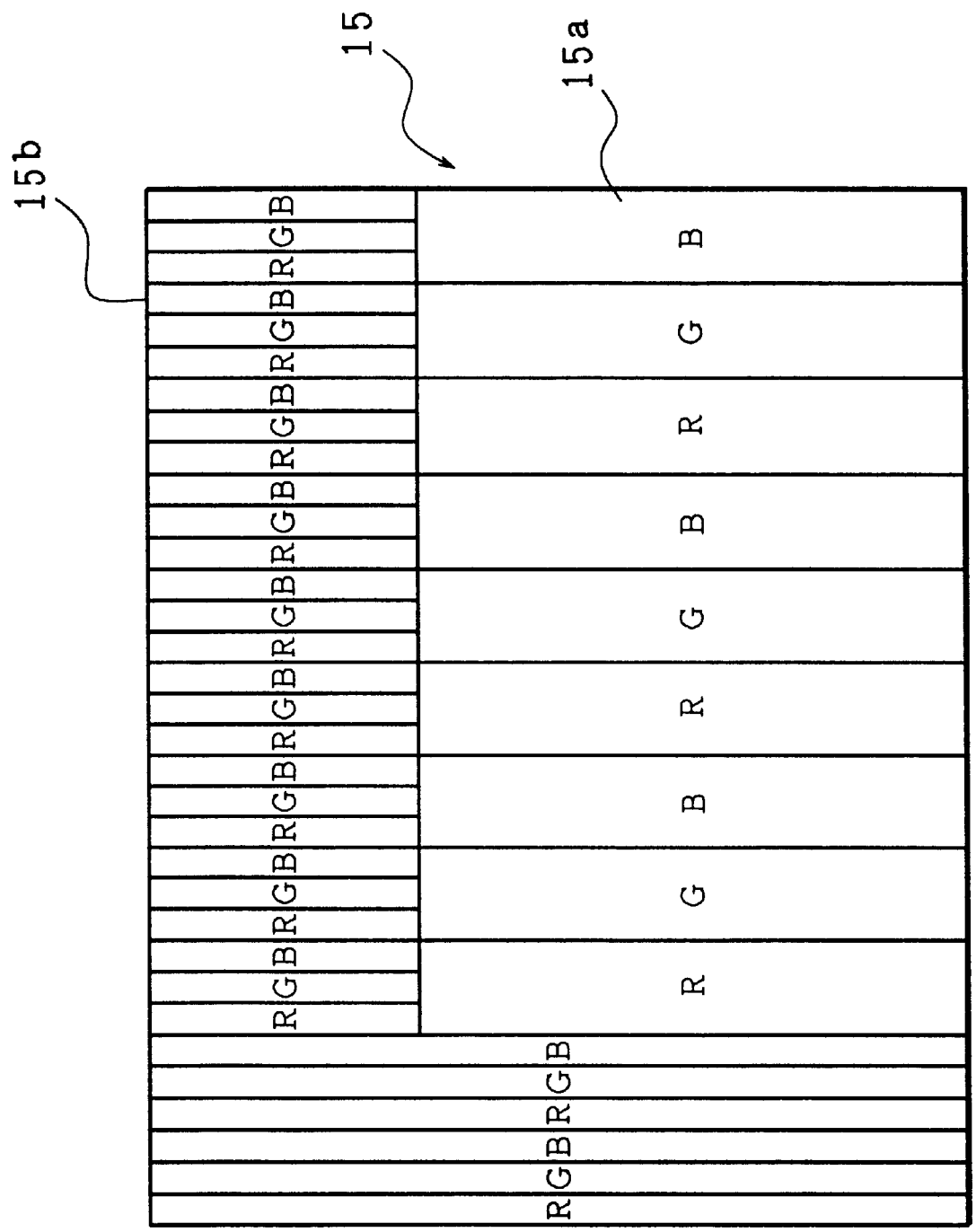
FIG. 6 is an explanatory drawing showing a main part of a variation of a stripe pattern formed in the color filter.

As shown in FIG. 6, the color filter frame 15b can be also formed by stripes of colors, which constitute the color filter used for the displaying pixel, for example, three colors of red (R), green (G), and blue (B), each stripe having a line width of 100 μm or less. However, an area ratio of the colors is varied so as to arbitrarily change a shade (color) of the color filter frame 15b.

Figure 7:
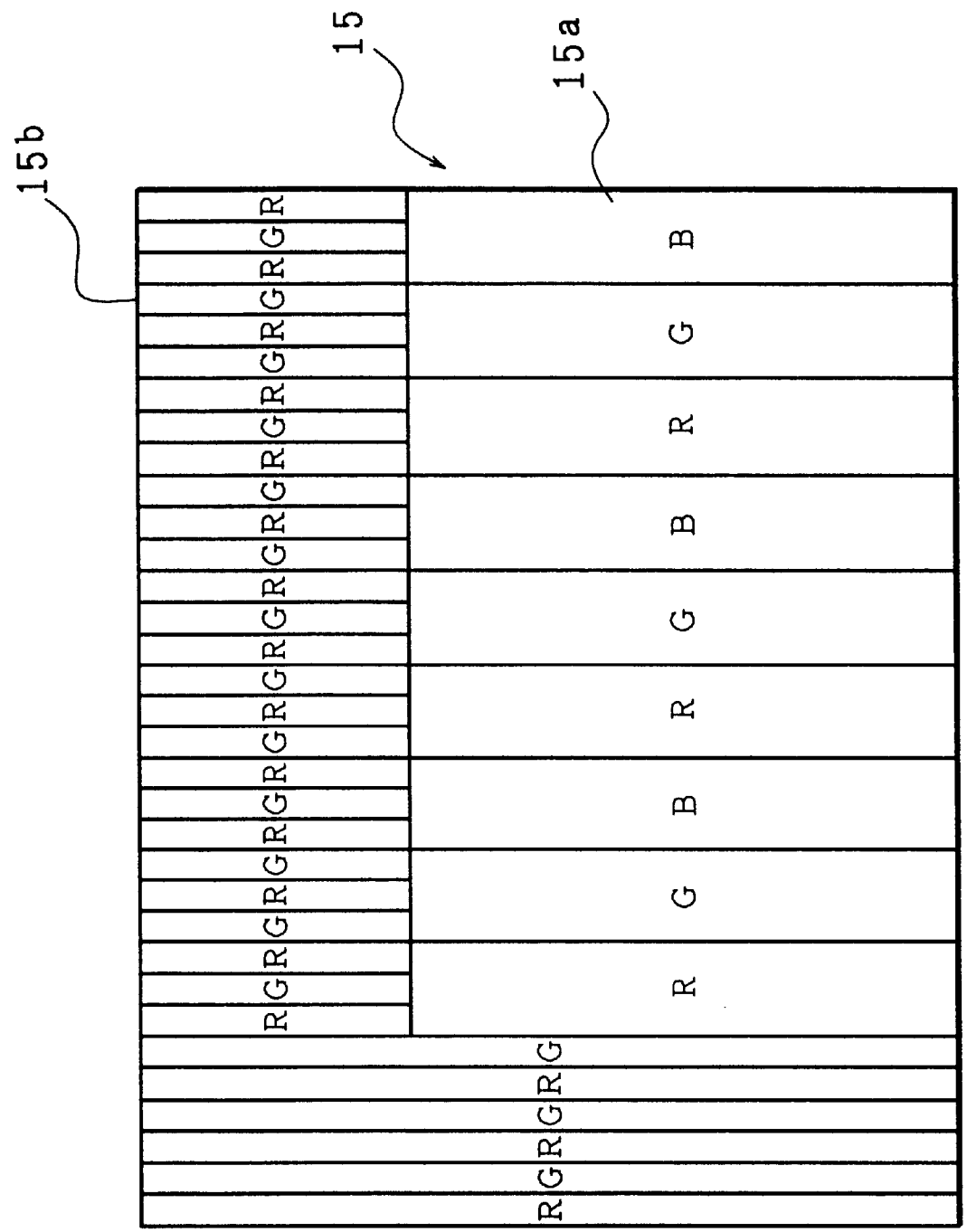
FIG. 7 is an explanatory drawing showing a main part of another variation of the stripe pattern.

Further, as shown in FIG. 7, the color filter frame 15b can be also formed by stripes having two colors of red (R) and green (G), which constitute the color filter used for the displaying pixel, each stripe having a line width of 100 μm or less. However, an area ratio of the colors is varied so as to arbitrarily change a shade of the color filter frame 15b.

Figure 8:
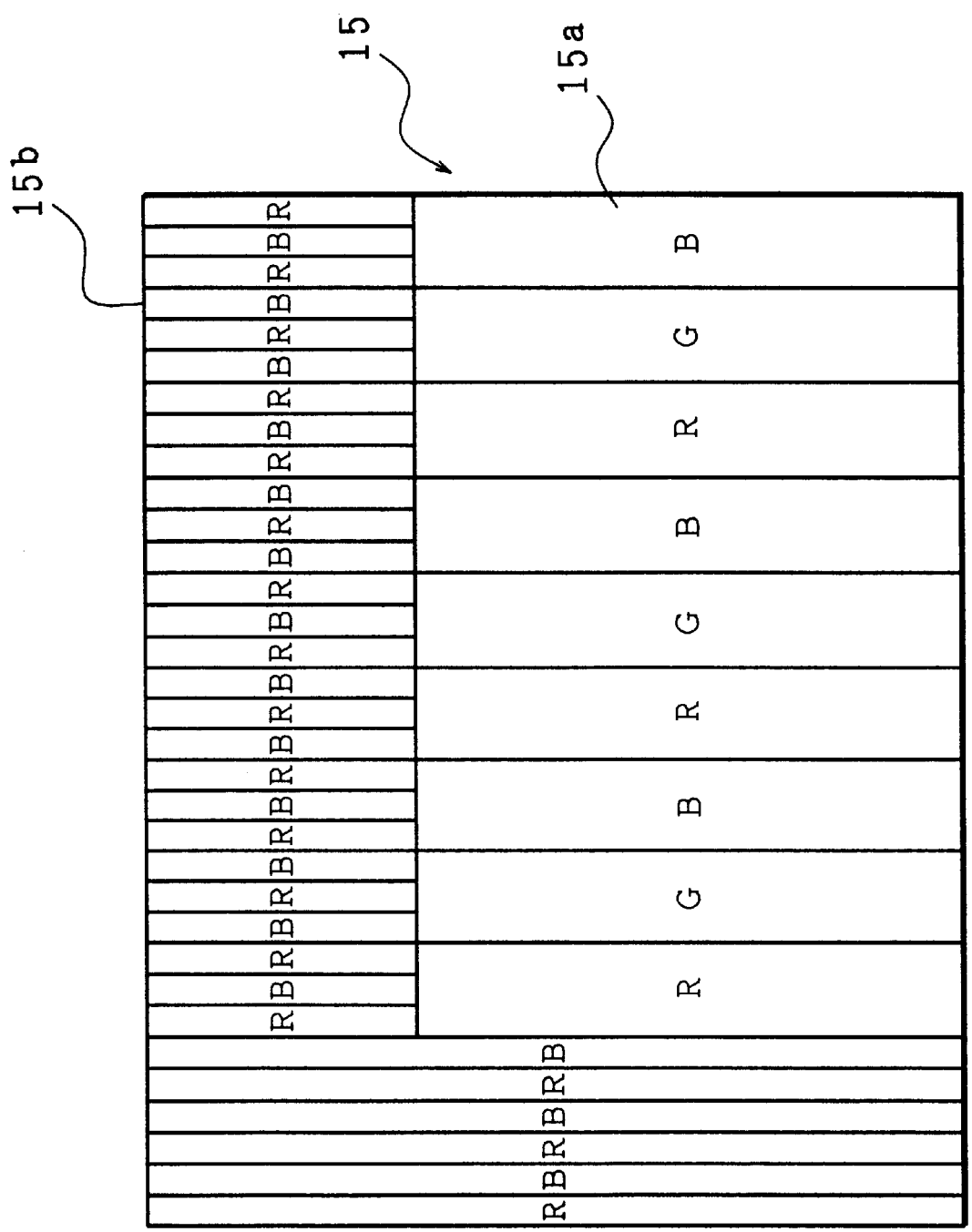
FIG. 8 is an explanatory drawing showing a main part of still another variation of the stripe pattern.

Moreover, as shown in FIG. 8, the color filter frame 15b can be also formed by stripes having two colors of red (R) and blue (B), which constitute the color filter used for the displaying pixel, each stripe having a line width of 100 μm or less. However, an area ratio of the colors is varied so as to arbitrarily change a shade of the color filter frame 15b.

Figure 9:
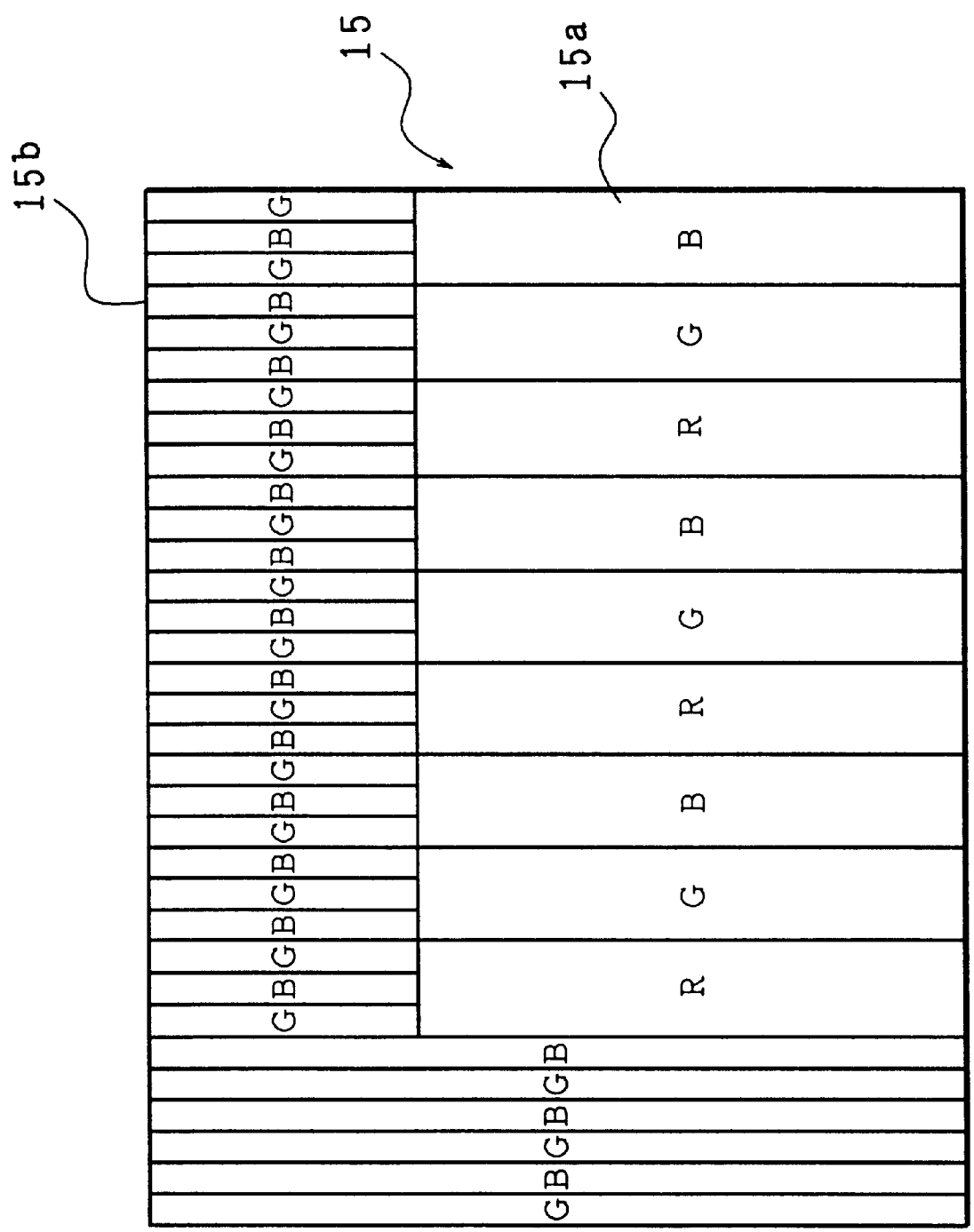
FIG. 9 is an explanatory drawing showing a main part of still another variation of the stripe pattern.

Furthermore, as shown in FIG. 9, the color filter frame 15b can be also formed by stripes having two colors of green (G) and blue (B), which constitute the color filter used for the displaying pixel, each stripe having a line width of 100 μm or less. However, an area ratio of the colors is varied so as to arbitrarily change a shade of the color filter frame 15b.

Figure 10:
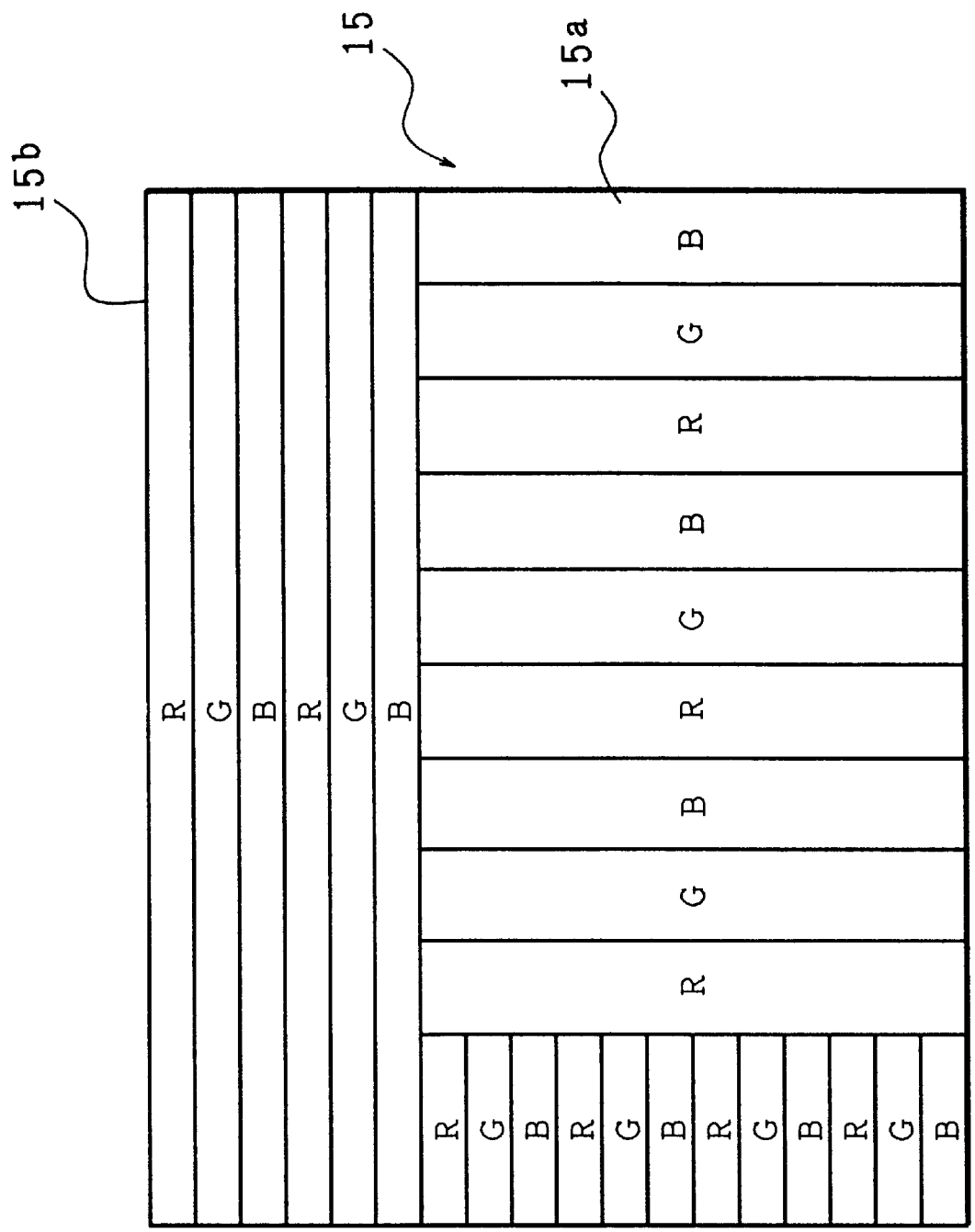
FIG. 10 is an explanatory drawing showing a main part of still another variation of the stripe pattern.
Figure 11:
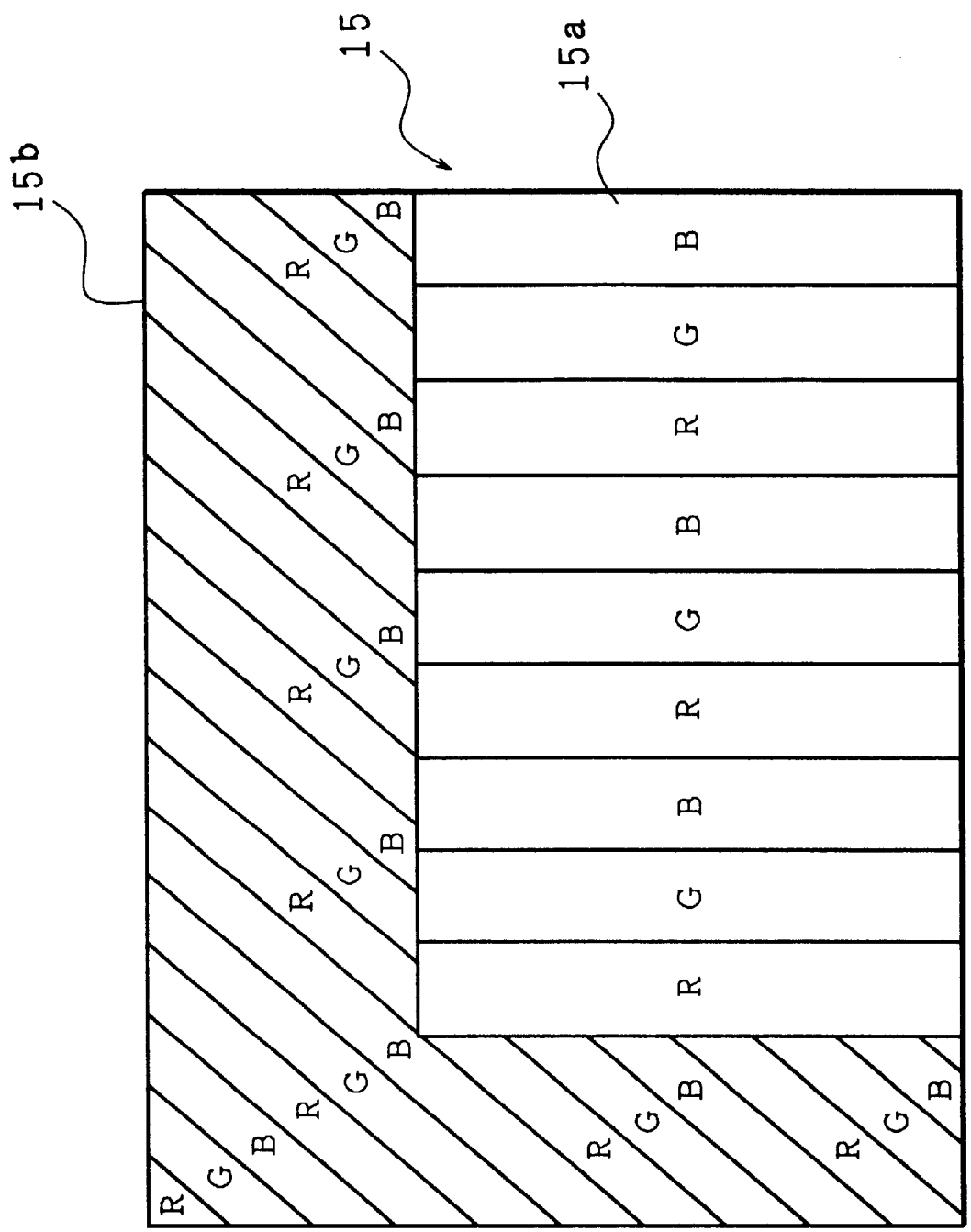
FIG. 11 is an explanatory drawing showing a main part of still another variation of the stripe pattern.
Figure 12:
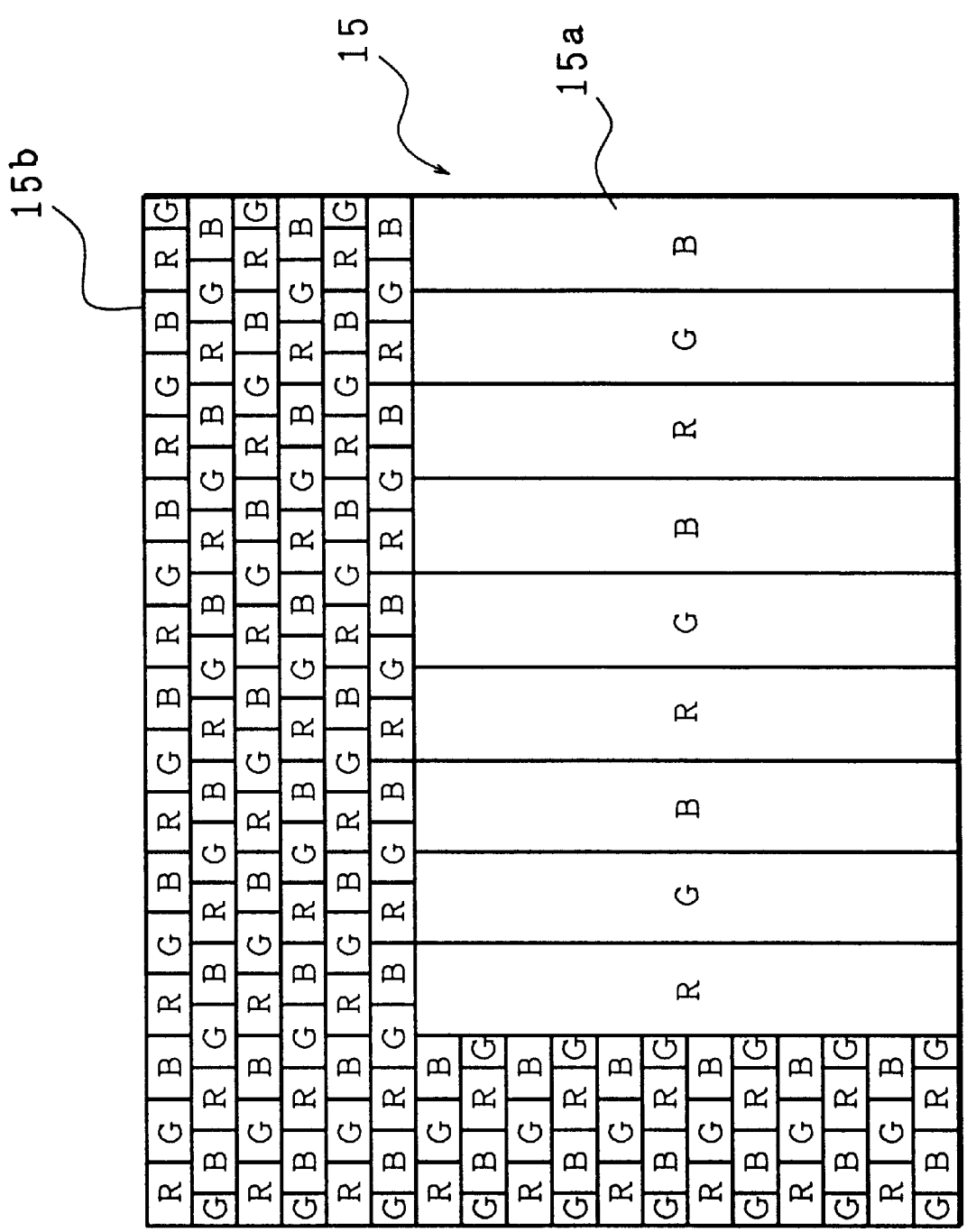
FIG. 12 is an explanatory drawing showing a main part of a variation of a delta pattern formed in the color filter.
Figure 13:
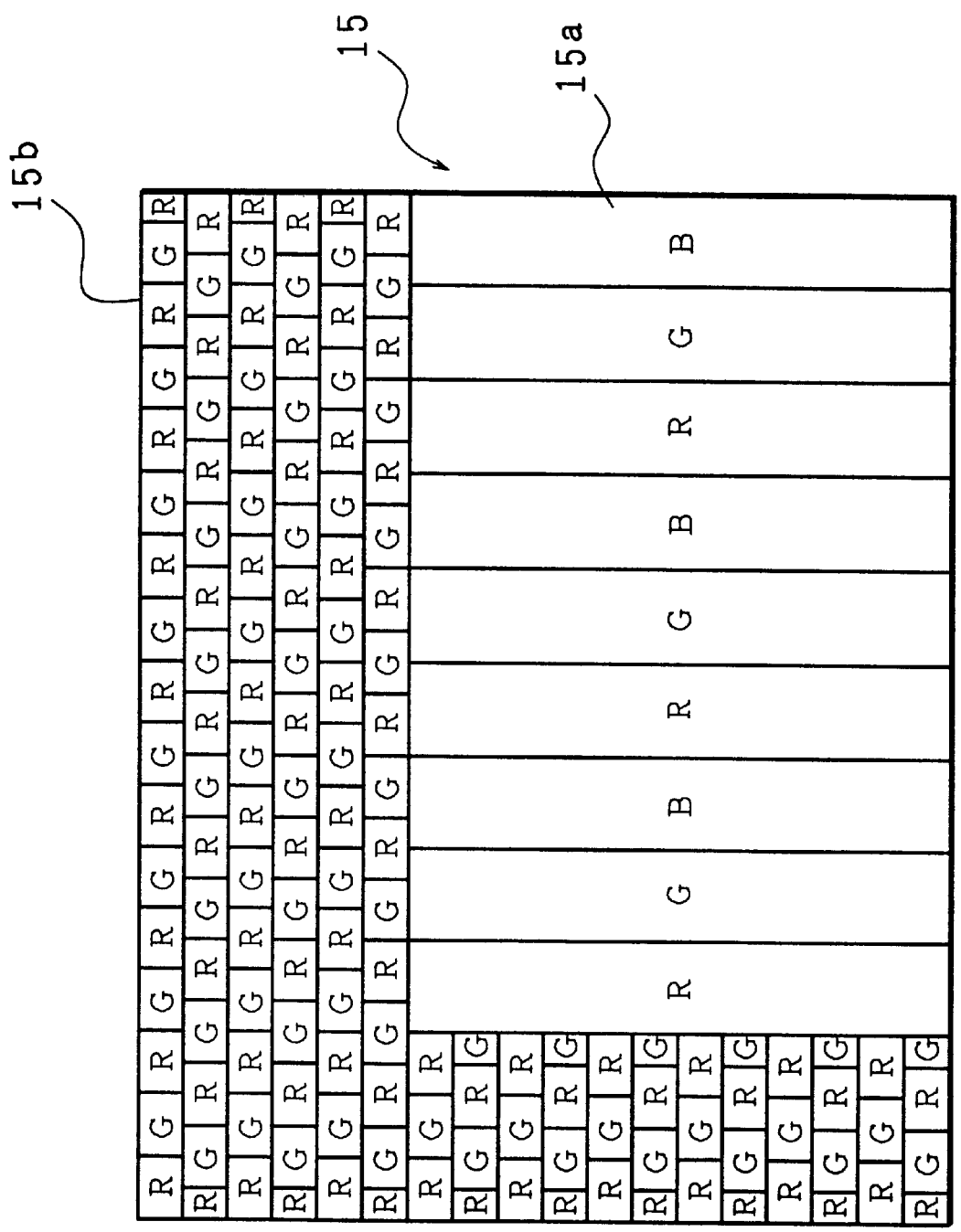
FIG. 13 is an explanatory drawing showing a main part of another variation of a delta pattern.
Figure 14:
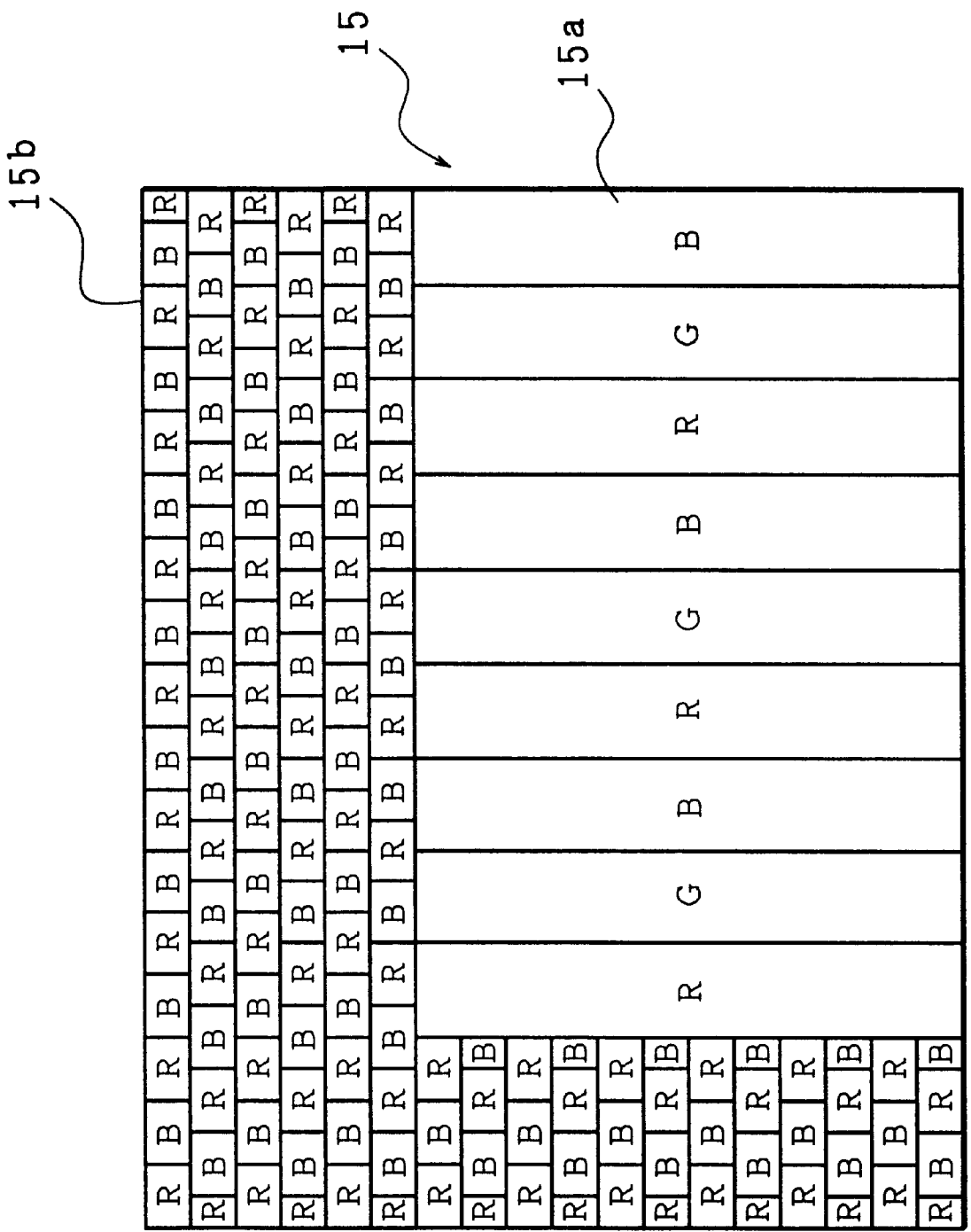
FIG. 14 is an explanatory drawing showing a main part of still another variation of the delta pattern.
Figure 15:
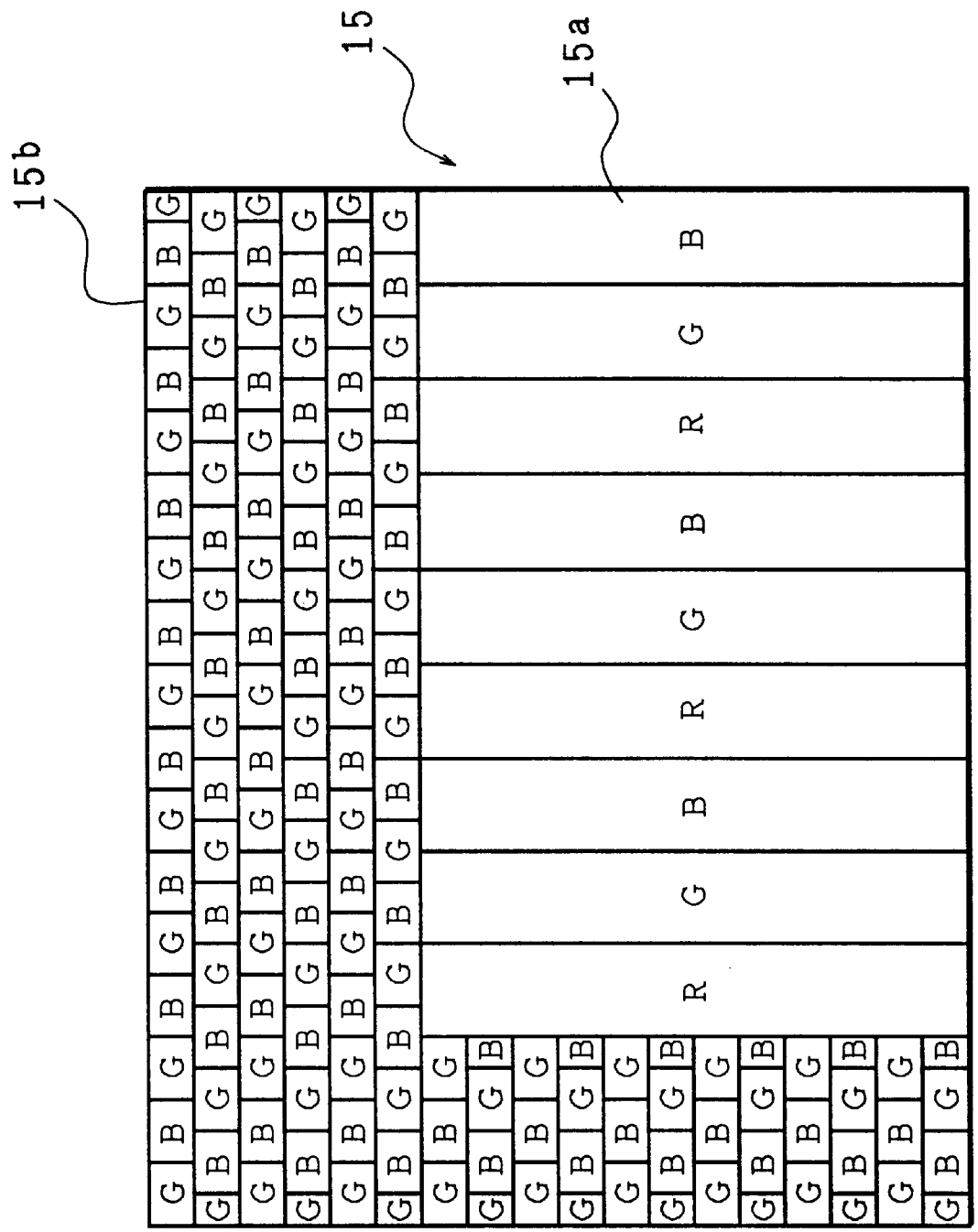
FIG. 15 is an explanatory drawing showing a main part of still another variation of the delta pattern.
Figure 16:
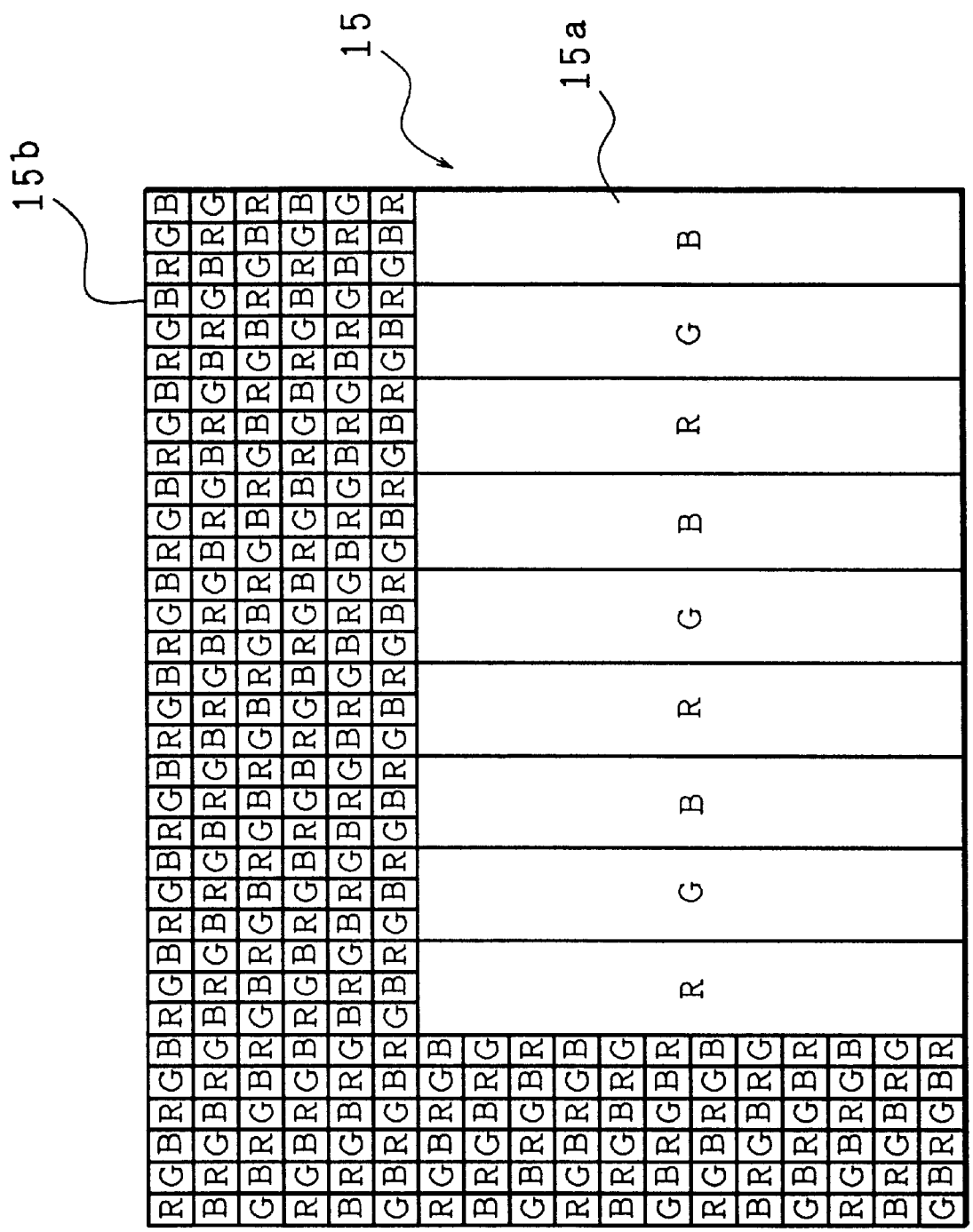
FIG. 16 is an explanatory drawing showing a main part of a variation of a mosaic pattern formed in the color filter.
Figure 17:
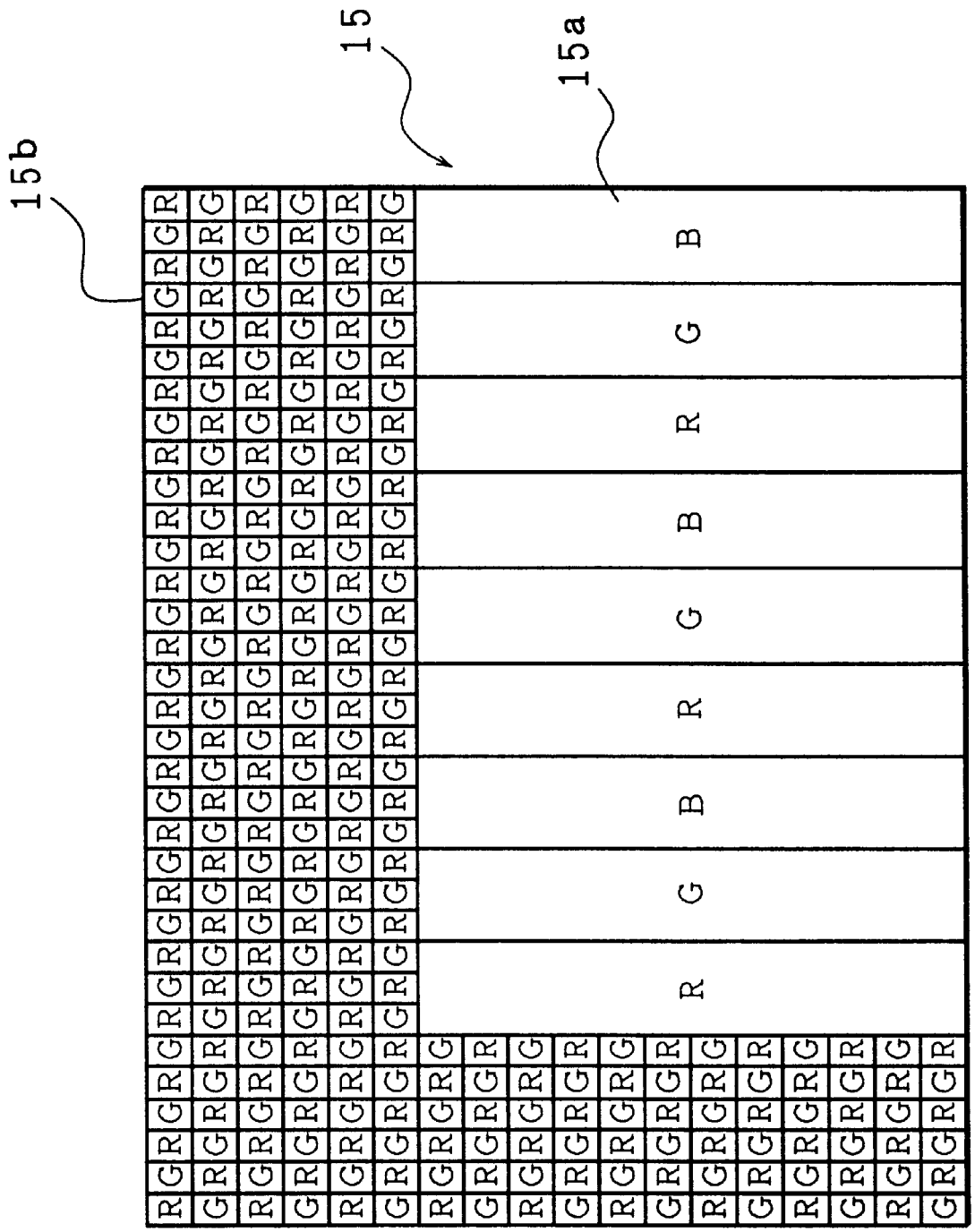
FIG. 17 is an explanatory drawing showing a main part of another variation of the mosaic pattern.
Figure 18:
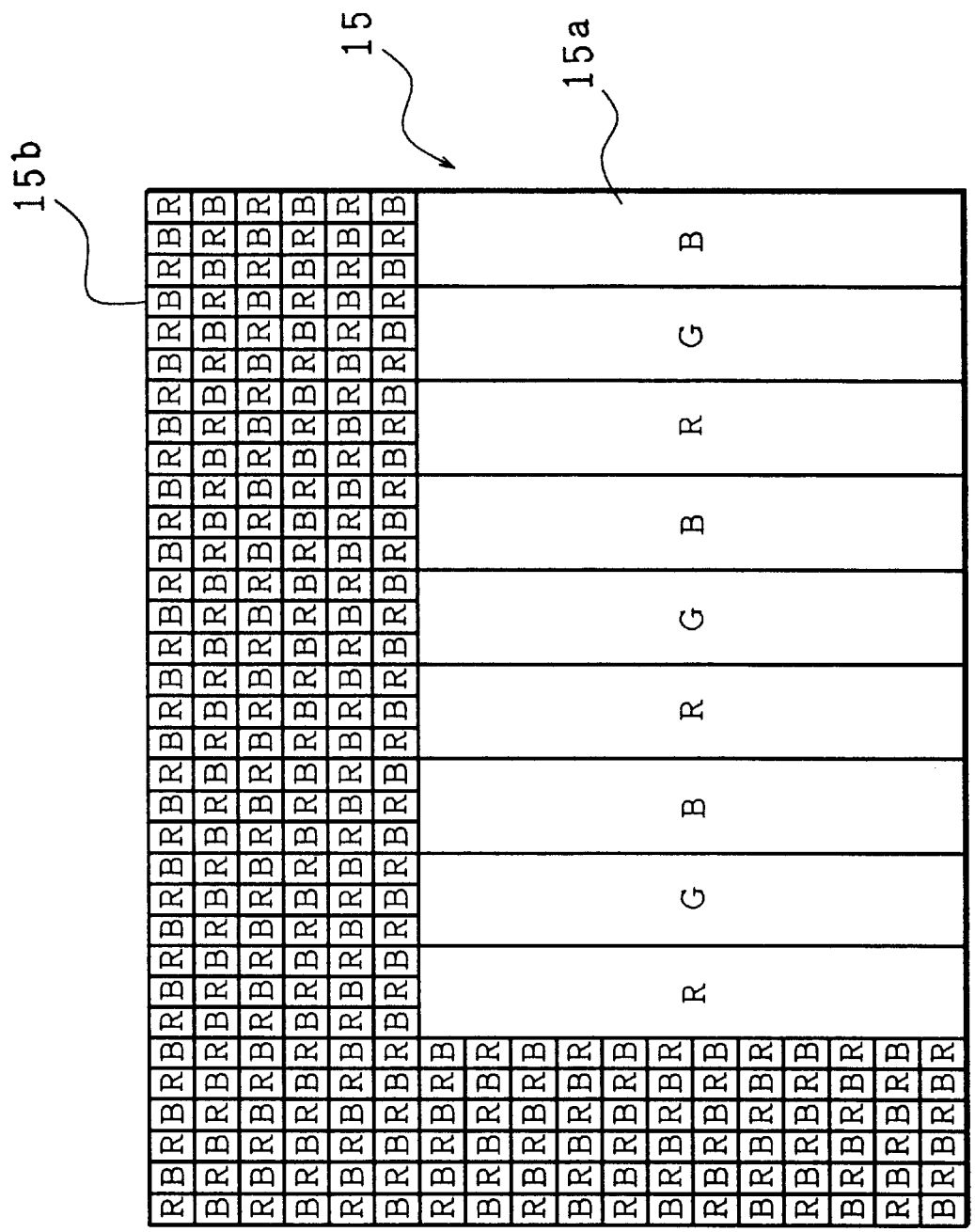
FIG. 18 is an explanatory drawing showing a main part of still another variation of the mosaic pattern.
Figure 19:
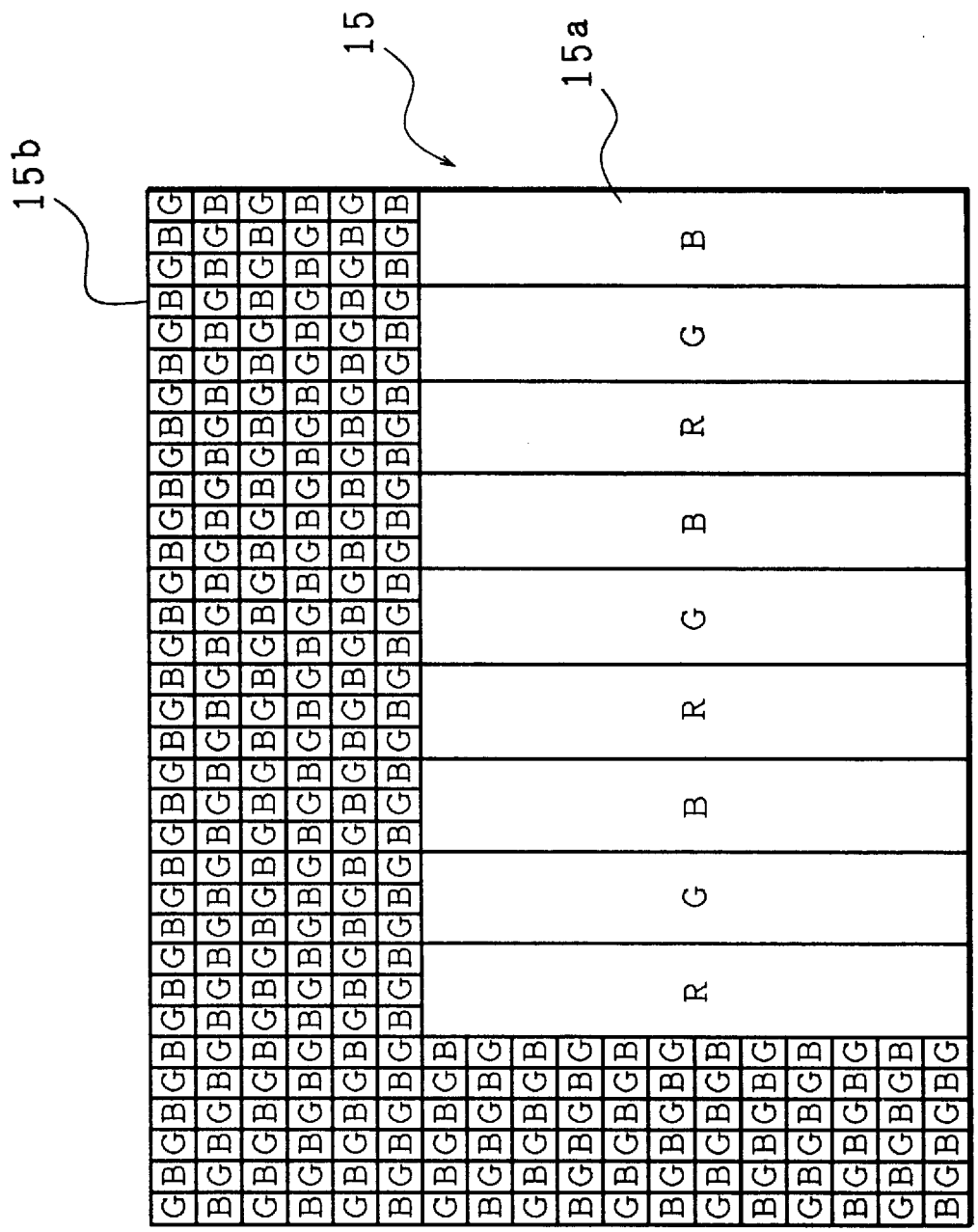
FIG. 19 is an explanatory drawing showing a main part of still another variation of the mosaic pattern.
Figure 20:
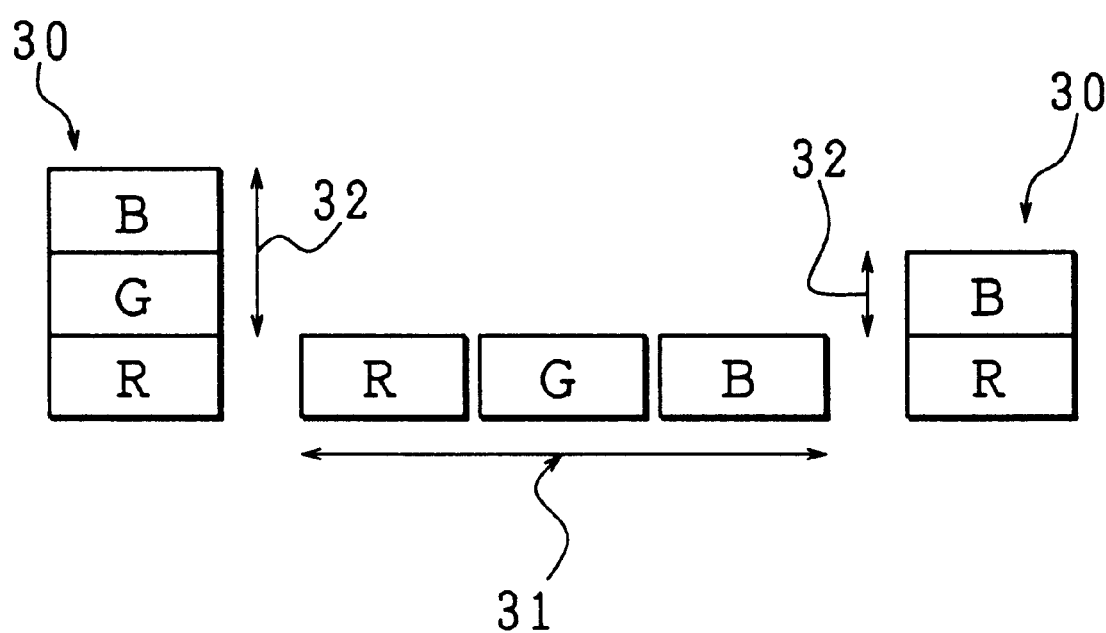
FIG. 20 is a schematic diagram showing a conventional color filter and an LCD using the same.

As mentioned above, when the color filter frame 15b is constituted by stripes, the construction pattern can be formed by horizontal stripes or diagonal stripes, that are shown in FIGS. 10 and 11, in addition to vertical stripes (along a short length of the color filter display 15a). Further, it is also possible to adopt the combination of the above stripe patterns.

Moreover, in the above arrangement, it is possible to adopt all kinds of shapes in the above stripe patterns. Additionally, a gap between the stripe patterns can be formed by overlaying the adjacent colors to each other. Furthermore, in a gap between the stripe patterns, some colors can be withdrawn.

Additionally, it is possible to separately provide the stripe pattern consisting of three colors of red (R), green (G), and blue (B), and the stripe pattern formed by one or two of the three colors, for example, red (R) and green (G).

In the same manner, it is possible to separately provide the stripe pattern consisting of three colors of red (R), green (G), and blue (B), and the stripe pattern of colors of red (R) and green (B). Also, it is possible to separately provide the stripe pattern consisting of red (R) and green (G), and blue (B), and the stripe pattern consisting of green (G) and blue (B).

In the same manner, it is possible to separately provide the stripe pattern consisting of red (R) and green (G) and the stripe pattern consisting of red (R) and blue (B). Further, it is possible to separately provide the stripe pattern consisting of red (R) and green (G) and the stripe pattern consisting of green (G) and blue (B). Moreover, it is possible to separately provide the stripe pattern consisting of red (R) and green (B) and the stripe pattern consisting of green (G) and blue (B).

In the same manner, it is possible to separately provide the stripe pattern consisting of three colors of red (R), green (G), and blue (B), and the stripe pattern having one of the colors of red (R), green (G), and blue (B).

Also, it is possible to separately provide the stripe pattern consisting of two colors of red (R) and green (G), and the stripe pattern having one of the colors of red (R), green (G), and blue (B).

In the same manner, it is possible to separately provide the stripe pattern consisting of two colors of red (R) and blue (B), and the stripe pattern having one of the colors of red (R), green (G), and blue (B).

Moreover, it is possible to separately provide the stripe pattern consisting of two colors of green (G) and blue (B), and the stripe pattern having one of the colors of red (R), green (G), and blue (B). Also, it is possible to combine some of the above combinations of the stripe patterns.

Further, in stead of the above stripe patterns, as shown in FIGS. 12 through 15, the present invention can have a delta pattern. However, an area ratio of the colors is varied so as to arbitrarily change a shade of the color filter frame 15b.

Furthermore, in stead of the above stripe patterns, as shown in FIGS. 16 through 19, the present invention can have a mosaic pattern. However, an area ratio of the colors is varied so as to arbitrarily change a shade of the color filter frame 15b.

Additionally, instead of the above stripe patterns, the present invention can have a random pattern (not shown) However, an area ratio of the colors is varied so as to arbitrarily change a shade of the color filter frame 15b.

The above explanation discussed the embodiments of the present invention; however, the present invention is not limited to the above constructions. In addition to the above patterns, it is possible to combine some of stripe, delta, mosaic, and random patterns.

In the present invention, the colors of red (R), green (G), and blue (B) are used for the color filter display 15a and the color filter frame 15b, that are described in the above Embodiments; however, colors are not limited to the above colors, so that it is possible to adopt three colors of cyan, magenta, and yellow instead of the above colors.

The color filter of the present invention can also have the following construction: a color filter display for providing a color display of an image, said color filter display being disposed so as to oppose a display surface for displaying an image by interrupting or passing light in displaying pixels and being provided with color filter picture elements of three colors so as to correspond to display pixels; a color filter frame is extended from ends of the display surface to the outside so as to oppose a non-display surface, the color filter frame being provided with the frame color filter picture elements using at least two of the colors used in the color filter picture elements; and an area ratio of the frame color filter picture elements corresponding to different colors is set so as to be different from that of the color filter picture elements, which correspond to the colors used in the frame color filter picture elements.

According to the above arrangement, the color filter frames, which extend from ends of the display surface to the outside and oppose the non-display surface, are provided so as to stably supply light to the displaying pixels, which are disposed around an outer edge of the display surface; thus, a color display can be stably provided on the display surface.

Further, according to the above arrangement, the color filter frames are respectively provided with the frame color filter picture elements, which use at least two of the colors used in the color filter picture elements, so that the color filter frames can be formed simultaneously with the color filter picture elements of the color filter display. Hence, it is possible to omit the conventional step of forming the black mask on the color filter frames and to simplify the step of forming the color filter frames.

Additionally, according to the above arrangement, an area ratio of the frame color filter picture elements corresponding to different colors is set so as to be different from that of the color filter picture elements, which correspond to the colors used in the frame color filter picture elements, so that it is possible to arbitrarily arrange colors appearing on the color filter frames. Thus, when the above arrangement is applied to, for example, an optical display device such as a color liquid crystal display device, in which a display surface for providing an image is flush with a non-display surface, it is possible to improve the appearance on and around the display surface during the operation of the optical display device.

The color filter can also have a construction in which an area ratio of the frame color filter picture elements is set based upon an optical property of the metal layer used for the black mask. According to this arrangement, regarding the color filter frames, it is possible to obtain a reflectivity property equivalent to that of the metal black mask, so that the coloring on the color filter frames becomes less visible.

The color filter can also have a construction in which the frame color filter picture elements have a pitch of 100 $\mu$m or less. According to this arrangement, the frame color filter picture elements have a pitch of 100 $\mu$m or less, so that the adjacent frame color filter picture elements cannot be individually recognized; consequently, it is possible to improve the appearance of the color filter frames.

The color filter can also have a construction in which the frame color filter picture elements are arranged with different spaces. According to this arrangement, it is possible to arbitrarily arrange colors appearing on the color filter frames. Hence, when this arrangement is applied to, for example, an optical display device such as a color liquid crystal display device, in which a display surface for displaying an image is flush with a non-display surface, it is possible to improve the appearance on and around the display surface during the operation of the optical display device.

The color filter can also have a construction in which the color filter frames are formed so as to have a desired optical property within a range of an optical property of the frame color filter picture elements, based upon an area ratio of the frame color filter picture elements.

According to the above arrangement, the color of the color filter frame is arbitrarily set within an optical property of the color filter picture elements; hence, when the color filter is used for, for example, an optical display device such as a color liquid crystal display device, it is possible to improve the appearance on and around the display surface during the operation of the optical display device.

The optical display device of the present invention can also have any one of the above color filters. According to this arrangement, when the color filter is used for, for example, an optical display device such as a color liquid crystal display device, in which a display surface for displaying an image is flush with a non-display surface, it is possible to improve the appearance on and around the display surface during the operation of the optical display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color filter comprising:

a color filter display which consists of picture elements corresponding to three colors and displays an image, and a color filter frame which serves as a frame of said color filter display and consists of picture elements corresponding to at least two of the three colors, said color filter frame having an area ratio of said picture elements that is different from that of said color filter display, said picture elements corresponding to different colors.

2. The color filter as defined in claim 1, wherein at least one of said picture elements corresponding to the different colors has a line width being different from those of said picture elements corresponding to other colors in said color filter frame.

3. The color filter as defined in claim 1, wherein said color filter frame has an area ratio of the picture elements that is set so as to allow said color filter frame to achieve a desired optical property, said picture elements corresponding to different colors.

4. The color filter as defined in claim 3, wherein said color filter frame has an area ratio of said picture elements that is set so as to allow said color filter frame to achieve a desired reflectivity, said picture elements corresponding to different colors.

5. The color filter as defined in claim 1, wherein said picture elements corresponding to the different colors respectively have a pitch of 100 $\mu$m or less in said color filter frame.

6. A color filter comprising:

a color filter display which consists of picture elements corresponding to three colors and displays an image, and a color filter frame which serves as a frame of said color filter display and consists of picture elements corresponding to at least two of the three colors, said color filter frame having an area ratio of said picture elements that is set so as to allow said color filter frame to have a desired color, said picture elements corresponding to different colors.

7. A color filter comprising:

a color filter display for providing a color display of an image, said color filter display being disposed so as to oppose a display surface for displaying an image by interrupting or passing light in displaying pixels and being provided with color filter picture elements of three colors so as to correspond to displaying pixels, a color filter frame which is provided with frame color filter picture elements using at least two of said colors used in said color filter picture elements, said color filter frame being extended from an end of said display surface to an outside so as to oppose a non-display surface, said frame color filter picture elements corresponding to different colors having an area ratio which is different from that of said color filter picture elements, which correspond to the colors used in said frame color filter picture elements.

8. The color filter as defined in claim 7, wherein said frame color filter picture elements have an area ratio which is set based on an optical property of a metal layer used for a black mask.

9. The color filter as defined in claim 7, wherein said frame color filter picture elements have a pitch of 100 $\mu$m or less.

10. The color filter as defined in claim 7, wherein said frame color filter picture elements are arranged with different spaces.

11. The color filter as defined in claim 7, wherein the color filter frame is formed so as to have a desired optical property in accordance with an area ratio of said frame color filter picture elements within a range of an optical property of each of said color filter elements.

12. An optical display device comprising a color filter, said color filter including:

a color filter display which consists of picture elements corresponding to three colors and displays an image, and a color filter frame which serves as a frame of said color filter display and consists of picture elements corresponding to at least two of the three colors, said color filter frame having an area ratio of said picture elements that is different from that of said color filter display, said picture elements corresponding to different colors.

13. The optical display device as defined in claim 12, wherein at least one of said picture elements corresponding to the different colors has a line width being different from those of said picture elements corresponding to other colors in said color filter frame.

14. The optical display device as defined in claim 12, wherein said color filter frame has an area ratio of said picture elements that is set so as to allow said color filter frame to achieve a desired reflectivity, said picture elements corresponding to different colors.

15. The optical display device as defined in claim 12, wherein said picture elements corresponding to the different colors respectively have a pitch of 100 $\mu$m or less in said color filter frame.

16. The optical display device as defined in claim 12, wherein said color filter frame has an area ratio of said picture elements that is set so as to allow said color filter frame to achieve a desired optical property, said picture elements corresponding to different colors.

17. An optical display device comprising a color filter, said color filter including:

a color filter display which consists of picture elements corresponding to three colors and displays an image, and a color filter frame which serves as a frame of said color filter display and consists of picture elements corresponding to at least two of the three colors, said color filter frame having an area ratio of said picture elements that is set so as to allow said color filter frame to have a desired color, said picture elements corresponding to different colors.

18. An optical display comprising a color filter, said color filter including:

a color filter display for providing a color display of an image, said color filter display being disposed so as to oppose a display surface for displaying an image by interrupting or passing light in displaying pixels and being provided with color filter picture elements of three colors so as to correspond to displaying pixels, a color filter frame which is provided with frame color filter picture elements using at least two of said colors used in said color filter picture elements, said color filter frame being extended from an end of said display surface to an outside so as to oppose a non-display surface, wherein said frame color filter picture elements corresponding to different colors have an area ratio which is different from that of said color filter picture elements, which correspond to the colors used in said frame color filter picture elements.

* * * * *